United States Patent
He et al.

(10) Patent No.: US 10,430,784 B1
(45) Date of Patent: Oct. 1, 2019

(54) MULTI-LAYER ANTENNA

(71) Applicant: Square, Inc., San Francisco, CA (US)

(72) Inventors: Yuchu He, Toronto (CA); Afshin Rezayee, Richmond Hill (CA); Haipeng Yan, Whitby (CA); Emad Bidari, Toronto (CA)

(73) Assignee: Square, Inc., San Francisco, CA (US)

( * ) Notice: Subject to any disclaimer, the term of this patent is extended or adjusted under 35 U.S.C. 154(b) by 39 days.

(21) Appl. No.: 15/692,995

(22) Filed: Aug. 31, 2017

(51) Int. Cl.
| | |
|---|---|
| *H01Q 1/30* | (2006.01) |
| *G06Q 20/32* | (2012.01) |
| *H04B 5/00* | (2006.01) |
| *H01Q 1/38* | (2006.01) |
| *H01Q 1/22* | (2006.01) |
| *H01Q 21/22* | (2006.01) |
| *H01Q 1/32* | (2006.01) |
| *H01Q 7/00* | (2006.01) |
| *H01Q 3/30* | (2006.01) |

(52) U.S. Cl.
CPC ....... *G06Q 20/3278* (2013.01); *H01Q 1/2216* (2013.01); *H01Q 1/38* (2013.01); *H01Q 21/22* (2013.01); *H04B 5/005* (2013.01); *H04B 5/0081* (2013.01); *H01Q 3/30* (2013.01); *H01Q 7/00* (2013.01)

(58) Field of Classification Search
CPC .. H01Q 1/30; H01Q 1/38; H01Q 5/35; H01Q 5/364; H01Q 5/40; H01Q 9/0407; H01Q 9/285; H01Q 21/28; H01Q 21/30
USPC .......................... 343/726, 728, 793, 865, 866
See application file for complete search history.

(56) References Cited

U.S. PATENT DOCUMENTS

| | | | |
|---|---|---|---|
| 5,679,943 A | 10/1997 | Schultz et al. | |
| 6,631,165 B1 | 10/2003 | Lambert et al. | |
| 6,680,700 B2 * | 1/2004 | Hilgers ................. | H01Q 1/243 343/700 MS |
| 7,309,012 B2 | 12/2007 | Von Mueller et al. | |
| 7,343,317 B2 | 3/2008 | Jokinen et al. | |
| 7,471,204 B2 | 12/2008 | Safarian et al. | |

(Continued)

FOREIGN PATENT DOCUMENTS

| | | |
|---|---|---|
| WO | 2015/128422 A1 | 9/2015 |
| WO | 2016/191299 A2 | 12/2016 |

OTHER PUBLICATIONS

Gebhart, M., et al., "Automated Antenna Impedance Adjustment for Near Field Communication (NFC)," 12th International Conference on Telecommunications (ConTEL), pp. 235-242 (Jun. 26-28, 2013).

(Continued)

*Primary Examiner* — Lee Nguyen
(74) *Attorney, Agent, or Firm* — Maynard Cooper & Gale, P.C.; Brian T. Sattizahn, Esq.

(57) ABSTRACT

A multi-layer antenna for near-field communications can have a first layer on a top surface of flexible circuit board and a second layer on a bottom surface of the flexible circuit board. The first layer and the second layer can be connected in series by a through connection in the flexible circuit board. The first layer can incorporate a single loop in the shape of a rectangle and the second layer can incorporate a single loop in the shape of a rectangle. The second layer of the antenna can be vertically aligned with the first layer of the antenna and can have current flow in the same direction as the first layer to provide for an increased magnetic flux from the antenna.

26 Claims, 12 Drawing Sheets

(56) References Cited

U.S. PATENT DOCUMENTS

| | | | |
|---|---|---|---|
| 7,945,494 B2 | 5/2011 | Williams |
| 7,945,949 B2 | 5/2011 | Johnson |
| 8,280,347 B2 | 10/2012 | Azimi et al. |
| 8,297,507 B2 | 10/2012 | Kayani |
| 8,302,860 B2 | 11/2012 | McKelvey |
| 8,336,771 B2 | 12/2012 | Tsai et al. |
| 8,573,486 B2 | 11/2013 | McKelvey et al. |
| 8,798,537 B2 | 8/2014 | Lee et al. |
| 8,876,003 B2 | 11/2014 | McKelvey |
| 9,047,598 B1 | 6/2015 | McKelvey et al. |
| 9,235,735 B2 | 1/2016 | Peters et al. |
| 9,250,452 B1 | 2/2016 | Yap et al. |
| 9,256,769 B1 | 2/2016 | Lamfalusi et al. |
| 9,306,401 B2 | 4/2016 | Lee et al. |
| 9,396,368 B1 | 7/2016 | Lamba et al. |
| 9,438,300 B1 | 9/2016 | Oliaei |
| 9,443,237 B2 | 9/2016 | McKelvey et al. |
| 9,460,322 B2 | 10/2016 | Lamfalusi et al. |
| 9,485,092 B2 | 11/2016 | Smets et al. |
| 9,503,178 B2 | 11/2016 | Lee et al. |
| 9,646,299 B1 | 5/2017 | Rezayee et al. |
| 9,760,883 B1 | 9/2017 | Wade |
| 9,781,549 B2 | 10/2017 | Lamba et al. |
| 9,936,337 B2 | 4/2018 | Lamba et al. |
| 10,198,727 B1 | 2/2019 | Rezayee et al. |
| 2002/0194141 A1 | 12/2002 | Langensteiner et al. |
| 2004/0104268 A1 | 6/2004 | Bailey |
| 2005/0212693 A1 | 9/2005 | Friedrich |
| 2005/0242173 A1 | 11/2005 | Suzuki |
| 2005/0242927 A1 | 11/2005 | Friedrich |
| 2005/0247787 A1 | 11/2005 | Von Mueller et al. |
| 2005/0287966 A1 | 12/2005 | Yoshimi et al. |
| 2006/0097874 A1 | 5/2006 | Salesky et al. |
| 2006/0109123 A1 | 5/2006 | Carrender |
| 2006/0125598 A1 | 6/2006 | Fischer et al. |
| 2006/0125605 A1 | 6/2006 | Fischer et al. |
| 2006/0287964 A1 | 12/2006 | Brown |
| 2007/0025456 A1 | 2/2007 | McCrady |
| 2007/0026826 A1 | 2/2007 | Wilson |
| 2007/0030126 A1 | 2/2007 | Friedrich |
| 2007/0063048 A1 | 3/2007 | Havens et al. |
| 2007/0090927 A1 | 4/2007 | Potyrailo et al. |
| 2007/0287498 A1 | 12/2007 | Wang et al. |
| 2008/0177662 A1 | 7/2008 | Smith et al. |
| 2008/0237345 A1 | 10/2008 | Moullette et al. |
| 2009/0215394 A1 | 8/2009 | Dewan |
| 2010/0148928 A1 | 6/2010 | Yeager et al. |
| 2010/0191653 A1 | 7/2010 | Johnson et al. |
| 2010/0201314 A1 | 8/2010 | Toncich et al. |
| 2010/0277003 A1 | 11/2010 | Von Novak et al. |
| 2010/0314446 A1 | 12/2010 | Morley, Jr. |
| 2011/0086601 A1 | 4/2011 | Ali et al. |
| 2011/0112920 A1 | 5/2011 | Mestre et al. |
| 2011/0160896 A1 | 6/2011 | Kim |
| 2011/0165896 A1 | 7/2011 | Stromberg et al. |
| 2011/0174879 A1 | 7/2011 | Morley, Jr. |
| 2011/0198395 A1 | 8/2011 | Chen |
| 2012/0086284 A1 | 4/2012 | Capanella et al. |
| 2012/0095867 A1 | 4/2012 | McKelvey |
| 2012/0095870 A1 | 4/2012 | McKelvey |
| 2012/0193434 A1 | 8/2012 | Grigg et al. |
| 2012/0203610 A1 | 8/2012 | Grigg et al. |
| 2013/0035051 A1 | 2/2013 | Mujtaba et al. |
| 2013/0040560 A1 | 2/2013 | Kennedy et al. |
| 2013/0073373 A1 | 3/2013 | Fisher |
| 2013/0084803 A1 | 4/2013 | Hall et al. |
| 2013/0109446 A1 | 5/2013 | Phillips |
| 2013/0137371 A1 | 5/2013 | Haverinen |
| 2013/0248601 A1 | 9/2013 | Liang et al. |
| 2014/0001263 A1 | 1/2014 | Babu et al. |
| 2014/0052637 A1 | 2/2014 | Jooste et al. |
| 2014/0061301 A1 | 3/2014 | Cho et al. |
| 2014/0101056 A1 | 4/2014 | Wendling |
| 2014/0127995 A1 | 5/2014 | Hendricksen et al. |
| 2014/0129425 A1 | 5/2014 | Yang et al. |
| 2014/0138435 A1 | 5/2014 | Khalid |
| 2014/0187153 A1 | 7/2014 | Zhu et al. |
| 2014/0279546 A1 | 9/2014 | Poole et al. |
| 2014/0302788 A1 | 10/2014 | McKelvey |
| 2014/0328488 A1 | 11/2014 | Caballero et al. |
| 2015/0044964 A1 | 2/2015 | Khan et al. |
| 2015/0118956 A1 | 4/2015 | Desai et al. |
| 2015/0162785 A1 | 6/2015 | Lee et al. |
| 2015/0195008 A1 | 7/2015 | Johnson et al. |
| 2015/0249485 A1 | 9/2015 | Ouyang et al. |
| 2015/0287022 A1 | 10/2015 | Granbery |
| 2015/0332240 A1 | 11/2015 | Harwood et al. |
| 2015/0332248 A1 | 11/2015 | Weksler et al. |
| 2015/0341073 A1 | 11/2015 | Ayala Vazquez et al. |
| 2015/0355251 A1 | 12/2015 | Pascolini |
| 2016/0012430 A1 | 1/2016 | Chandrasekaran et al. |
| 2016/0050629 A1 | 2/2016 | Khesbak et al. |
| 2016/0126619 A1 | 5/2016 | Tenbroek et al. |
| 2016/0142174 A1 | 5/2016 | Fine et al. |
| 2016/0147239 A1 | 5/2016 | Yan et al. |
| 2016/0156327 A1 | 6/2016 | Wang |
| 2016/0210613 A1 | 7/2016 | McGill |
| 2016/0232515 A1 | 8/2016 | Jhas et al. |
| 2016/0249157 A1 | 8/2016 | Fine |
| 2016/0371716 A1 | 12/2016 | Aitenbichler et al. |
| 2017/0200152 A1 | 7/2017 | Winkler et al. |
| 2017/0290079 A1 | 10/2017 | Raj et al. |
| 2018/0097531 A1* | 4/2018 | Kummaraguntla .. H04B 1/0458 |
| 2018/0295489 A1 | 10/2018 | Lamba et al. |

OTHER PUBLICATIONS

Hao, H., et al., "A Parallel Topology for Inductive Power Transfer Power Supplies," IEEE Transactions on Power Electronics, vol. 29, No. 3, pp. 1140-1151 (Mar. 2014).

Non-Final Office Action dated Apr. 10, 2015 for U.S. Appl. No. 14/189,997, of Lamfalusi, M., et al., filed Feb. 25, 2014.

Non-Final Office Action dated Apr. 13, 2015, for U.S. Appl. No. 14/641,080, of McKelvey, J., M., et al., filed Mar. 6, 2015.

Notice of Allowance dated Aug. 18, 2015, for U.S. Appl. No. 14/641,080, of McKelvey, J., M., et al., filed Mar. 6, 2015.

Non-Final Office Action dated Nov. 20, 2015, for U.S. Appl. No. 14/641,080, of McKelvey, J.M., et al., filed Mar. 6, 2015.

Notice of Allowance dated Nov. 23, 2015 for U.S. Appl. No. 14/189,997, of Lamfalusi, M., et al., filed Feb. 25, 2014.

Non-Final Office Action dated Nov. 25, 2015, for U.S. Appl. No. 14/868,261, of Lamba, K., et al., filed Sep. 28, 2015.

Non-Final Office Action dated Jan. 6, 2016, for U.S. Appl. No. 14/866,128, of Rezayee, A., et al., filed Sep. 25, 2015.

Non-Final Office Action dated Feb. 25, 2016, for U.S. Appl. No. 14/979,407, of Lamfalusi, M., et al., filed Dec. 27, 2015.

Final Office Action dated Mar. 9, 2016, for U.S. Appl. No. 14/641,080, of McKelvey, J. M., et al., filed Mar. 6, 2015.

Notice of Allowance dated Mar. 18, 2016, for U.S. Appl. No. 14/868,261, of Lamba, K., et al., filed Sep. 28, 2015.

Notice of Allowance dated May 23, 2016, for U.S. Appl. No. 14/641,080, of McKelvey, J.M., et al., filed Mar. 6, 2015.

Notice of Allowance dated Jun. 13, 2016, for U.S. Appl. No. 14/979,407, of Lamfalusi, M., et al., filed Dec. 27, 2015.

Non-Final Office Action dated Aug. 5, 2016, for U.S. Appl. No. 14/866,128, of Rezayee, A., et al., filed Sep. 25, 2015.

Non-Final Office Action dated Oct. 25, 2016, for U.S. Appl. No. 14/868,247, of Lamba, K., et al., filed Sep. 28, 2015.

Non-Final Office Action dated Dec. 8, 2016, for U.S. Appl. No. 14/986,308, of Wade, J., filed Dec. 31, 2015.

Notice of Allowance dated Jan. 11, 2017, for U.S. Appl. No. 14/866,128, of Rezayee, A., et al., filed Sep. 25, 2015.

Non-Final Office Action dated Jan. 25, 2017, for U.S. Appl. No. 15/094,598, of Lamba, K., et al., filed Apr. 8, 2016.

Final Office Action dated Mar. 21, 2017, for U.S. Appl. No. 14/868,247, of Lamba, K., et al., filed Sep. 28, 2015.

Notice of Allowance dated Apr. 28, 2017, for U.S. Appl. No. 14/986,308, of Wade, J., filed Dec. 31, 2015.

(56) References Cited

OTHER PUBLICATIONS

Advisory Action dated May 26, 2017, for U.S. Appl. No. 14/868,247, of Lamba, K., et al., filed Sep. 28, 2015.
Notice of Allowance dated May 31, 2017, for U.S. Appl. No. 15/094,598, of Lamba, K., et al., filed Apr. 8, 2016.
Corrected Notice of Allowance dated Aug. 10, 2017, for U.S. Appl. No. 14/986,308, of Wade, J., filed Dec. 31, 2015.
Notice of Allowance dated Nov. 20, 2017, for U.S. Appl. No. 14/868,247, of Lamba, K., et al., filed Sep. 28, 2015.
Non-Final Office Action dated Feb. 12, 2018, for U.S. Appl. No. 14/859,034, of White, M. W., et al., filed Sep. 18, 2015.
Non-Final Office Action dated Apr. 20, 2018, for U.S. Appl. No. 14/858,940, of Grassadonia, B., et al., filed Sep. 18, 2015.
Non-Final Office Action dated May 17, 2018, for U.S. Appl. No. 14/865,789, of Rezayee, A., et al., filed Sep. 25, 2015.
International Search Report and Written Opinion for International Patent Application No. PCT/US2016/033601, dated Nov. 22, 2016.
Final Office Action dated Jul. 5, 2018, for U.S. Appl. No. 14/859,034, of White, M.W., et al., filed Sep. 18, 2015.
Notice of Allowance dated Sep. 19, 2018, for U.S. Appl. No. 14/865,789, of Rezayee, A., et al., filed Sep. 25, 2015.
Non-Final Office Action dated Nov. 20, 2018, for U.S. Appl. No. 14/859,034, of White, M.W., et al., filed Sep. 18, 2015.
Ryan, P., "Plug and Pay: A Gallery of 26 Mobile Card Readers," Aug. 20, 2013, Retrieved from the Internet URL: http://bankinnovation.net/2013/08/plug-and-pay-a-gallery-of-26-mobile-card-readers/, on Feb. 19, 2015, pp. 1-12.
Non-Final Office Action dated Jan. 2, 2019, for U.S. Appl. No. 14/858,974, of Hernandez, M., et al., filed Sep. 18, 2015.
Non-Final Office Action dated Feb. 6, 2019, for U.S. Appl. No. 15/941,795, of Lamba, K., et al., filed Mar. 30, 2018.
Final Office Action dated Feb. 25, 2019, for U.S. Appl. No. 14/858,940, of Grassadonia, B., et al., filed Sep. 18, 2015.

* cited by examiner

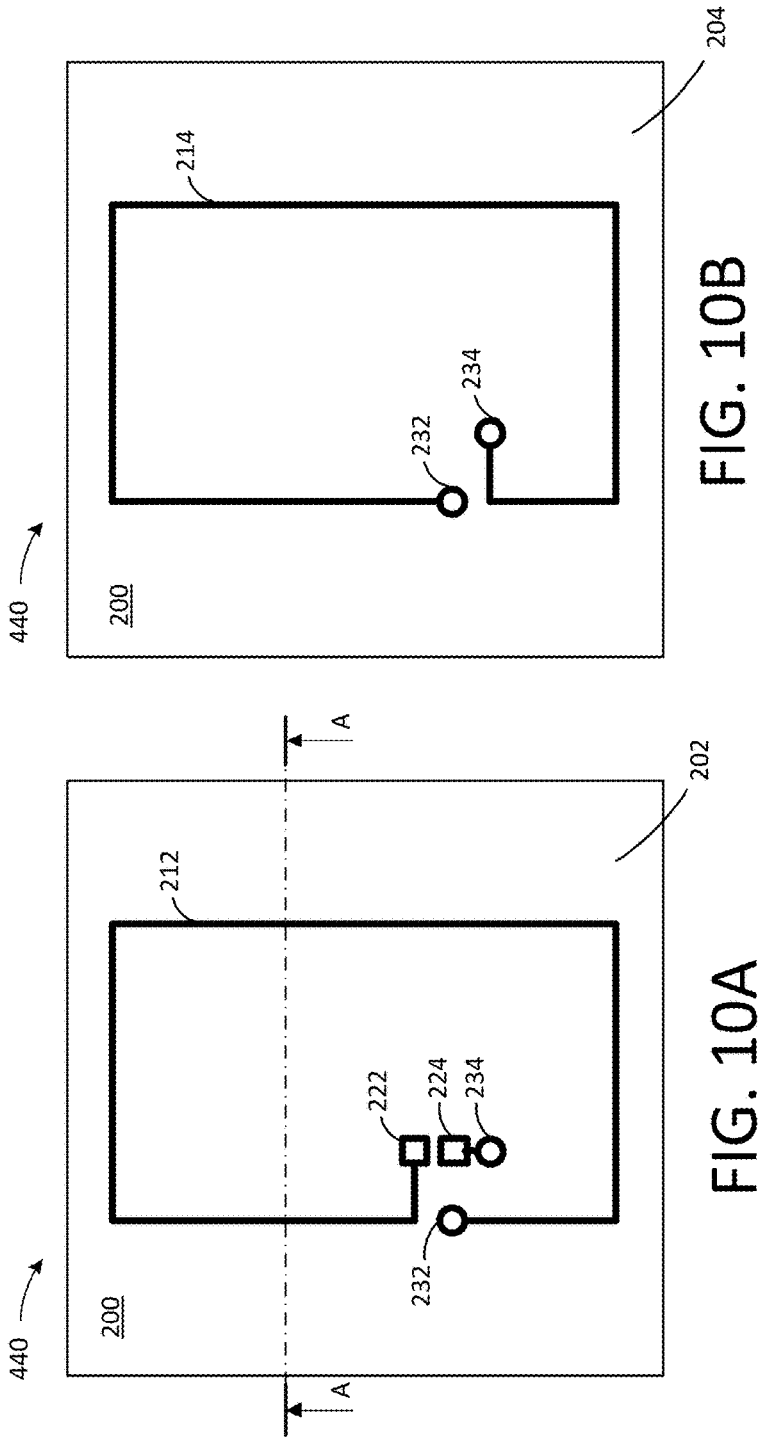
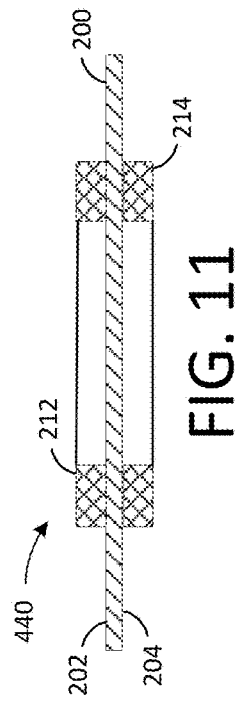

MULTI-LAYER ANTENNA

BACKGROUND

Near field communication ("NFC") devices are capable of communicating when they are placed in close proximity to each other, and may be used for transactions such as payment transactions. Each of the NFC communication devices includes an antenna and related circuitry such as a matching circuit. A first NFC communication device generates a wireless carrier signal at a suitable frequency such as 13.56 MHz and transmits that signal over its antenna. When the antenna of a second NFC communication device is placed in close proximity to the antenna of the first NFC communication device, the two devices become inductively coupled, such that energy is coupled between the two devices through a shared magnetic field.

When the two NFC communication devices are inductively coupled, either of the NFC communication devices may communicate via modulated versions of the wireless carrier signal. The first NFC communication device may modify aspects of the wireless carrier signal such as amplitude, frequency, and phase prior to transmission in order to encode data that is transmitted to the second NFC communication device. During times that the first device is not transmitting, the second NFC communication device may encode data that is transmitted to the first NFC communication device. The second NFC communication device modifies the inductively coupled signal using techniques such as active or passive load modulation. The first NFC communication device receives the encoded data based on the changes to the inductively coupled signal.

The use of NFC for payment transactions requires the antenna of the customer's NFC-capable payment device to be placed in close proximity to the antenna of the merchant's NFC-capable payment terminal in order to inductively couple the NFC communication devices for the exchange data between the two NFC communication devices. However, the antenna of the merchant's NFC-capable payment terminal may have several locations with very weak mutual coupling capabilities. The locations with weak coupling capabilities can be referred to as "dead zones" and can correspond to areas where the magnetic flux of the magnetic field produced by the antenna of the merchant's NFC-capable payment terminal is reduced as a result of the configuration of the antenna and/or the relative positions of the customer's NFC-capable payment device and the merchant's NFC-capable payment terminal. When the customer's NFC-capable payment device is located in one of the "dead zones," the merchant's NFC-capable payment terminal may not be able to inductively couple with the customer's NFC-capable payment device, thereby preventing or limiting the exchange of data between the merchant's NFC-capable payment terminal and the customer's NFC-capable payment device.

BRIEF DESCRIPTION OF THE DRAWINGS

The above and other features of the present disclosure, its nature and various advantages will be more apparent upon consideration of the following detailed description, taken in conjunction with the accompanying drawings in which:

FIG. 10A depicts a top view of an exemplary antenna in accordance with some embodiments of the present disclosure;

FIG. 10B depicts a bottom view of the exemplary antenna of FIG. 10A in accordance with some embodiments of the present disclosure;

FIG. 11 depicts a cross-sectional view of the exemplary antenna of FIG. 10A taken along line A-A of FIG. 10A;

DETAILED DESCRIPTION

Figure 1:
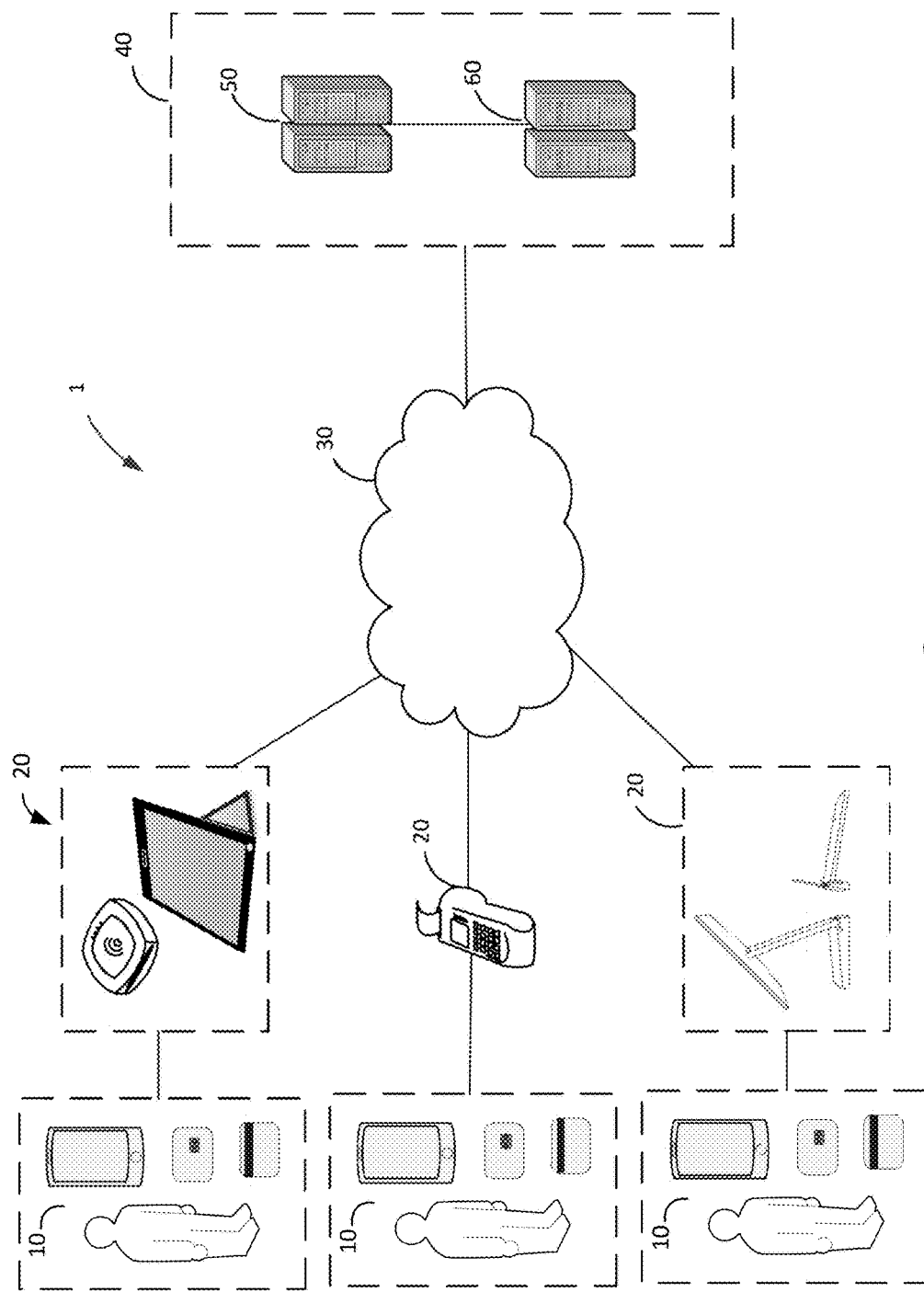
FIG. 1 shows an illustrative block diagram of a payment system in accordance with some embodiments of the present disclosure.

A payment system may include a payment terminal and a payment server. The payment terminal receives payment information from a payment device such as an EMV chip card, a magnetic stripe card, or a NFC payment device. In addition, the payment terminal provides a user interface for a merchant and communicates with both the payment device and the payment server to process payment transactions. The payment server processes payment transactions based on the payment information, as well as other information (e.g., payment amount, merchant, location, etc.), received from the payment terminal and then communicates a payment result (e.g., an approval or denial) back to the payment terminal.

The payment terminal may have a variety of components for wirelessly communicating payment information with a payment device, such as a near field communications (NFC) system for radio frequency (RF) communications and a card slot with physical and electrical connectivity. The payment terminal may have an antenna for transmitting a RF signal to allow the payment terminal to communicate data wirelessly with a payment device. The data communication can be based on a wireless carrier signal transmitted by the antenna of the payment terminal that is used to inductively couple with the payment device. In order to transmit data from the payment terminal to the payment reader, the payment terminal may modulate the wireless carrier signal and transmit the modulated wireless signal via the antenna.

The antenna can be a multi-layer antenna provided on a flexible printed circuit board. A first layer of the multi-layer antenna can be positioned on the top surface of the flexible printed circuit board while a second layer of the multi-layer antenna can be positioned on the bottom surface of the flexible printed circuit board. The first layer and the second layer can be connected in series by a through connection that extends from the top surface of the flexible printed circuit board to the bottom surface of the flexible printed circuit board. The first layer and the second layer can receive the signal to be transmitted from corresponding terminals on the flexible printed circuit board.

The first layer of the antenna can have a circuit path or trace laid out as a single loop in the shape of a rectangle and the second layer of the antenna can have a circuit path or trace laid out as a single loop in the shape of a rectangle. The second layer of the antenna can be vertically aligned with the first layer of the antenna such that the first layer and the second layer are stacked or have the same relative position on the opposed surfaces of the flexible printed circuit board. In addition, the second layer can be positioned on the bottom surface of the flexible printed circuit board such that the current that flows through the second layer in the same direction as the current flowing in the first layer. The vertical alignment of the first layer and the second layer permit the effective magnetic flux of the antenna to be increased by a significant percentage (e.g., 30-40%) without having to increase the size of the antenna. The increase in magnetic flux can be obtained from the combining or cumulative effect of the magnetic flux in each of the first layer and the second layer since the current is flowing in the same direction in each of the layers and the layers are vertically aligned. In addition, the increased magnetic flux enables a predetermined flux pattern from the antenna to be defined.

The payment terminal may measure a phase difference and/or a current of an NFC transmission circuit and tune a signal transmitted from the antenna. A transmission source may provide a transmission source signal. Before transmission from the antenna, a tuning circuit may tune the transmission source signal using components such as an adjustable capacitor and provide a tuned transmission signal to the antenna. A sense circuit coupled to the antenna may measure the transmitted signal, and provide the measurement to a phase detection circuit for comparison with the transmission source signal.

When it receives the measured transmitted signal from the sense circuit, the phase detection circuit compares it with the transmission source signal to determine a phase shift between the two signals. A desired phase shift may be associated with an optimal transmission efficiency of the antenna. If the phase shift is not within a threshold of the desired phase shift, the transmission characteristics of the transmit circuit may be modified such as by modifying a value of a variable capacitor.

A current measurement of a power source for the transmit circuit and antenna may be used to adjust the operation of the transmit circuit and antenna. The values of components of the transmit circuit (e.g., a variable capacitor) may be iterated through a number of values and the current draw from of the transmit circuit and antenna may be measured. These values may be used to identify an optimal value for the variable capacitor, based on the capacitor value that results in the minimum current draw value. The association between measured current and capacitor values may be checked periodically during operation and under different operating conditions to update the value of the variable capacitor. Current measurements from the transmit circuit and antenna power source may also be used to set the desired face shift, where a measured phase shift that corresponds to the minimum current value corresponds to the desired phase shift.

FIG. 1 depicts an illustrative block diagram of a payment system 1 in accordance with some embodiments of the present disclosure. In one embodiment, payment system 1 includes a payment device 10, payment terminal 20, network 30, and payment server 40. In an exemplary embodiment, payment server 40 may include a plurality of servers operated by different entities, such as a payment service system 50 and a bank server 60. The components of payment system 1 facilitate electronic payment transactions between a merchant and a customer.

The electronic interactions between the merchant and the customer take place between the customer's payment device 10 and the merchant's payment terminal 20. The customer has a payment device 10 such as a credit card having magnetic stripe, a credit card having an EMV chip, or a NFC-enabled electronic device such as a smart phone running a payment application. The merchant has a payment terminal 20 such as a payment terminal or other electronic device that is capable of processing payment information (e.g., encrypted payment card data and user authentication data) and transaction information (e.g., purchase amount and point-of-purchase information), such as a smart phone or tablet running a payment application.

In some embodiments (e.g., for low-value transactions or for payment transactions that are less than a payment limit indicated by a NFC or EMV payment device 10) the initial processing and approval of the payment transaction may be processed at payment terminal 20. In other embodiments, payment terminal 20 may communicate with payment server 40 over network 30. Although payment server 40 may be operated by a single entity, in one embodiment payment server 40 may include any suitable number of servers operated by any suitable entities, such as a payment service system 50 and one or more banks of the merchant and customer (e.g., a bank server 60). The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and respond to payment terminal 20 over network 30 to indicate whether or not the payment transaction is authorized. Payment server 40 may also transmit additional information such as transaction identifiers to payment terminal 20.

Based on the information that is received at payment terminal 20 from payment server 40, the merchant may indicate to the customer whether the transaction has been approved. In some embodiments such as a chip card payment device, approval may be indicated at the payment terminal, for example, at a screen of a payment terminal. In other embodiments such as a smart phone or watch operating as a NFC payment device, information about the approved transaction and additional information (e.g., receipts, special offers, coupons, or loyalty program information) may be provided to the NFC payment device for display at a screen of the smart phone or watch or storage in memory.

Figure 2:
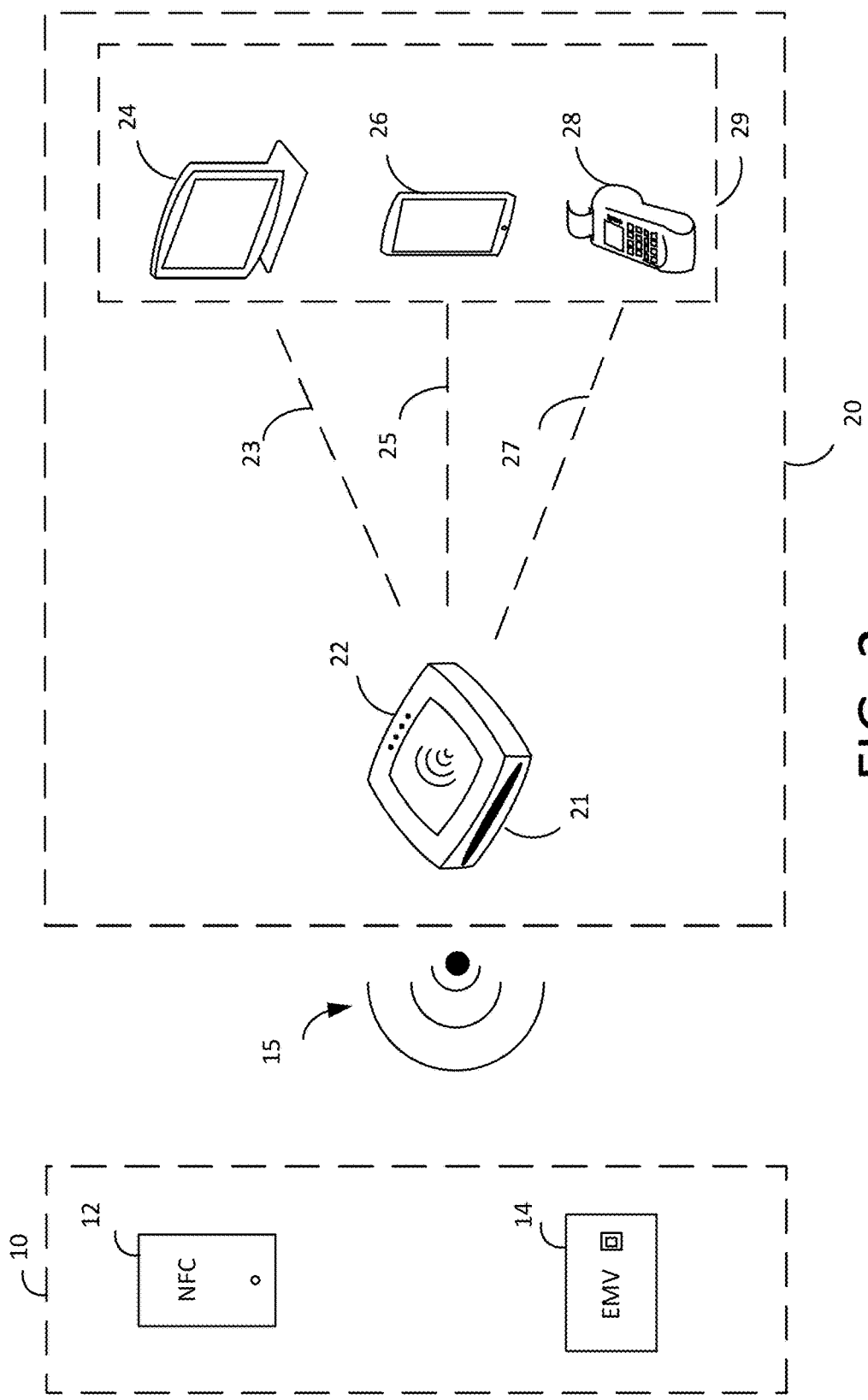
FIG. 2 depicts an illustrative block diagram of a payment device and payment terminal in accordance with some embodiments of the present disclosure.

FIG. 2 depicts an illustrative block diagram of payment device 10 and payment terminal 20 in accordance with some embodiments of the present disclosure. Although it will be understood that payment device 10 and payment terminal 20 of payment system 1 may be implemented in any suitable manner, in one embodiment the payment terminal 20 may incorporate a payment reader 22 and a merchant device 29. However, it will be understood that as used herein, the term payment terminal may refer to any suitable component of the payment terminal 20, such as payment reader 22. In an embodiment, the payment reader 22 of payment terminal 20 may be a wireless communication device that facilitates transactions between the payment device 10 and a merchant device 29 running a point-of-sale application.

In one embodiment, payment device 10 may be a device that is capable of communicating with payment terminal 20 (e.g., via payment reader 22), such as a NFC device 12 or an EMV chip card 14. Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with payment reader 22 (e.g., in accordance with ISO 7816) and in some embodiments, may be inductively coupled to payment reader 22 via a near field 15. A chip card 14 that is inductively coupled to payment reader 22 may communicate with payment reader 22 using load modulation of a wireless carrier signal that is provided by payment reader 22 in accordance with a wireless communication standard such as ISO 14443.

NFC device 12 may be an electronic device such as a smart phone, tablet, or smart watch that is capable of engaging in secure transactions with payment terminal 20 (e.g., via communications with payment reader 22). NFC device 12 may have hardware (e.g., a secure element including hardware and executable code) and/or software (e.g., executable code operating on a processor in accordance with a host card emulation routine) for performing secure transaction functions. During a payment transaction NFC device 12 may be inductively coupled to payment reader 22 via near field 15 and may communicate with payment terminal 20 by active or passive load modulation of a wireless carrier signal provided by payment reader 22 in accordance with one or more wireless communication standards such as ISO 14443 and ISO 18092.

Although payment terminal 20 may be implemented in any suitable manner, in one embodiment payment terminal 20 may include a payment reader 22 and a merchant device 29. The merchant device 29 executes a point-of-sale application that provides a user interface for the merchant and facilitates communication with the payment reader 22 and the payment server 40. Payment reader 22 may facilitate communications between payment device 10 and merchant device 29. As described herein, a payment device 10 such as NFC device 12 or chip card 14 may communicate with payment reader 22 via inductive coupling. This is depicted in FIG. 2 as near field 15, which comprises a wireless carrier signal having a suitable frequency (e.g., 13.56 MHz) emitted from payment reader 22.

In one embodiment, payment device 10 may be a contactless payment device such as NFC device 12 or chip card 14, and payment reader 22 and the contactless payment device 10 may communicate by modulating the wireless carrier signal within near field 15. In order to communicate information to payment device 10, payment reader 22 changes the amplitude and/or phase of the wireless carrier signal based on data to be transmitted from payment reader 22, resulting in a wireless data signal that is transmitted to the payment device. This signal is transmitted by an antenna of payment reader 22 that is tuned to transmit at 13.56 MHz, and if the payment device 10 also has a suitably tuned antenna within the range of the near field 15 (e.g., 0 to 10 cm), the payment device receives the wireless carrier signal or wireless data signal that is transmitted by payment reader 22. In the case of a wireless data signal, processing circuitry of the payment device 10 is able to demodulate the received signal and process the data that is received from payment reader 22.

When a contactless payment device such as payment device 10 is within the range of the near field 15, it is inductively coupled to the payment reader 22. Thus, the payment device 10 is also capable of modulating the wireless carrier signal via active or passive load modulation. By changing the tuning characteristics of the antenna of payment device 10 (e.g., by selectively switching a parallel load into the antenna circuit based on modulated data to be transmitted) the wireless carrier signal is modified at both the payment device 10 and payment reader 22, resulting in a modulated wireless carrier signal. In this manner, the payment device is capable of sending modulated data to payment reader 22.

In some embodiments, payment reader 22 also includes a card slot 21 that is capable of receiving chip card 14. Chip card 14 may have contacts that engage with corresponding contacts of payment reader 22 when chip card 14 is inserted into card slot 21. Payment reader 22 provides power to an EMV chip of chip card 14 through these contacts and payment reader 22 and chip card 14 communicate through a communication path established by the contacts.

Payment reader 22 may also include hardware for interfacing with a magnetic strip card (not depicted in FIG. 2). In some embodiments, the hardware may include a slot that guides a customer to swipe or dip the magnetized strip of the magnetic strip card such that a magnetic strip reader can receive payment information from the magnetic strip card. The received payment information is then processed by the payment reader 22.

Merchant device 29 may be any suitable device such as tablet payment device 24, mobile payment device 26, or payment terminal 28. In the case of a computing device such as tablet payment device 24 or mobile payment device 26, a point-of-sale application may provide for the entry of purchase and payment information, interaction with a customer, and communications with a payment server 40. For example, a payment application may provide a menu of services that a merchant is able to select and a series of menus or screens for automating a transaction. A payment application may also facilitate the entry of customer authentication information such as signatures, PIN numbers, or biometric information. Similar functionality may also be provided on a dedicated payment terminal 28.

Merchant device 29 may be in communication with payment reader 22 via a communication path 23/25/27. Although communication path 23/25/27 may be implemented via a wired (e.g., Ethernet, USB, FireWire, Lightning) or wireless (e.g., Wi-Fi, Bluetooth, NFC, or ZigBee)

connection, in one embodiment payment reader 22 may communicate with the merchant device 29 via a Bluetooth low energy interface, such that the payment reader 22 and the merchant device 29 are connected devices. In some embodiments, processing of the payment transaction may occur locally on payment reader 22 and merchant device 29, for example, when a transaction amount is small or there is no connectivity to the payment server 40. In other embodiments, merchant device 29 or payment reader 22 may communicate with payment server 40 via a public or dedicated communication network 30. Although communication network 30 may be any suitable communication network, in one embodiment communication network 30 may be the internet and payment and transaction information may be communicated between payment terminal 20 and payment server 40 in an encrypted format such by a transport layer security (TLS) or secure sockets layer (SSL) protocol.

Figure 3:
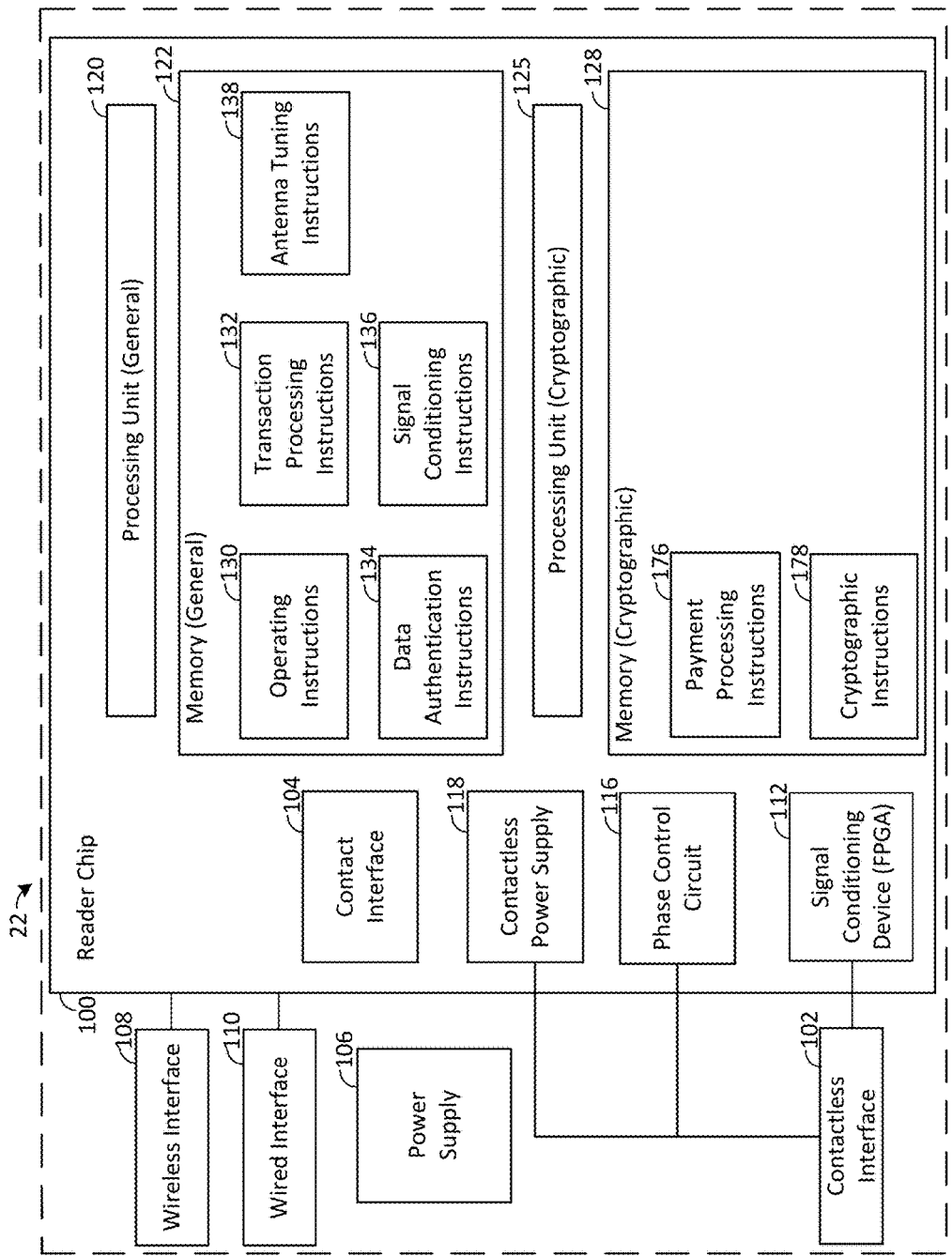
FIG. 3 depicts an illustrative block diagram of a payment reader in accordance with some embodiments of the present disclosure.

FIG. 3 depicts a block diagram of an exemplary payment reader 22 in accordance with some embodiments of the present disclosure. In one embodiment, payment reader 22 may communicate with an interactive electronic device such as a merchant device 29 via wireless (e.g., using Bluetooth classic or Bluetooth low energy) or wired (e.g., using USB connectors) connections. Although particular components are depicted in a particular arrangement in FIG. 3, it will be understood that payment reader 22 may include additional components, one or more of the components depicted in FIG. 3 may not be included in payment reader 22, and the components of payment reader 22 may be rearranged in a suitable manner.

In one embodiment, payment reader 22 includes a reader chip 100, a plurality of payment interfaces (e.g., a contactless interface 102 and a contact interface 104), a power supply 106, a wireless communication interface 108, a wired communication interface 110, and a signal conditioning device 112. Payment reader 22 (e.g., the reader chip 100 of payment reader 22) may also include a general processing unit 120 (e.g., a terminal/reader processing unit), general memory 122, a cryptographic processing unit 125 and cryptographic memory 128, a phase control circuit 116, a contact interface 104, and NFC signal conditioning device 112. Although in one embodiment, the processing units 120, 125, memories 122, 128, contact interface 104, signal conditioning device 112, and phase control circuit 116 will be described as packaged in a reader chip 100, and configured in a particular manner, it will be understood that general processing unit 120, general memory 122, a cryptographic processing unit 125 cryptographic memory 128, contact interface 104, signal conditioning device 112, and phase control circuit 116 may be located and configured in other suitable manners to perform the functionality of the payment reader 22 as is described herein. It will also be understood that the functionality of reader chip 100 may be embodied in a single chip or a plurality of chips, each including any suitable combination of processing units, memory, and other components to collectively perform the functionality of reader chip 100 described herein.

In some embodiments, processing unit 120 of reader chip 100 of payment reader 22 may be a suitable processor and may include hardware, software, memory, and circuitry as is necessary to perform and control the functions of payment reader 22. Processing unit 120 may include one or more processors, and may perform the operations of reader chip 100 based on instructions provided from any suitable number of memories and memory types. In some embodiments, processing unit 120 may have multiple independent processing units, for example a multi-core processor or other similar component. Processing unit 120 may execute instructions stored in memory 122 of reader chip 100 to control the operations and processing of payment reader 22. As used herein, a processor or processing unit may include one or more processors having processing capability necessary to perform the processing functions described herein, including but not limited to hardware logic (e.g., hardware designed by software that describes the configuration of hardware, such as hardware description language (HDL) software), computer readable instructions running on a processor, or any suitable combination thereof. A processor may execute software to perform the operations described herein, including software accessed in machine readable form on a tangible non-transitory computer readable storage medium.

In an exemplary embodiment, the processing unit 120 of reader chip 100 may include two RISC processors configured to operate as a hub for controlling operations of the various components of payment reader 22, based on instructions stored in memory 122. As used herein, memory may refer to any suitable tangible or non-transitory storage medium. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory (embedded or non-embedded), disks or optical storage, magnetic storage, or any other non-transitory medium that stores information that is accessed by a processor or computing device.

Reader chip 100 may also include additional circuitry (not depicted) such as interface circuitry, analog front end circuitry, security circuitry, and monitoring component circuitry. In one embodiment, the interface circuitry may include circuitry for interfacing with a wireless communication interface 108 (e.g., Wi-Fi, Bluetooth classic, and Bluetooth low energy), circuitry for interfacing with a wired communication interface 110 (e.g., USB, Ethernet, FireWire, HDMI and Lightning), circuitry for interfacing with other communication interfaces or buses (e.g., I²C, SPI, UART, and GPIO), and circuitry for interfacing with a power supply 106 (e.g., power management circuitry, power conversion circuitry, rectifiers, and battery charging circuitry).

In an exemplary embodiment, reader chip 100 may perform functionality relating to the processing of payment transactions, interfacing with payment devices, cryptography, and other payment-specific functionality. In some embodiments, reader chip 100 may include a cryptographic processing unit 125 for handling cryptographic processing operations. Note that each of general processing unit 120 and cryptographic processing unit 125 may have dedicated memory associated therewith (e.g., general memory 122 and cryptographic memory 128). In this manner, specific cryptographic processing and critical security information (e.g., cryptographic keys, passwords, user information, etc.), may be securely stored by cryptographic memory 128 and processed by cryptographic processing unit 125.

One or both of general processing unit 120 and cryptographic processing unit 125 of reader chip 100 may communicate with the other (e.g., processing unit 120 may communicate with cryptographic processing unit 125 and vice versa), for example, using any suitable internal bus and communication technique. In this manner, reader chip 100 can process transactions and communicate information regarding processed transactions (e.g., with merchant device 29).

Reader chip 100 may also include circuitry for implementing a contact interface 104 (e.g., power and communication circuitry for directly interfacing with an EMV chip of a chip card 14 that is inserted into slot 21). In some embodiments, reader chip 100 may also include a signal conditioning FPGA 112 and analog front end circuitry for interfacing with contactless interface 102 (e.g., electromagnetic compatibility (EMC) circuitry, matching circuits, modulation circuitry, and measurement circuitry). In addition, reader chip 100 may comprise one or more pins for providing a transmission signal (e.g., positive or negative transmit pins) having a desired polarity. In some embodiments, the one or more pins may be coupled to a component of the contactless interface 102, such as a tuning circuit, a power control circuit, or other component.

Contactless interface 102 may provide for NFC communication with a contactless device such as NFC device 12 or chip card 14. Based on a signal provided by reader chip 100, an antenna of contactless interface 102 may output either a carrier signal or a modulated signal. A carrier signal may be a signal having a fixed frequency such as 13.56 MHz. A modulated signal may be a modulated version of the carrier signal according to a modulation procedure such as ISO 14443 and ISO 18092. When the payment reader 22 is inductively coupled to a contactless device, the contactless device may also modulate the carrier signal, which may be sensed by the contactless interface 102 and provided to the reader chip 100 for processing. Based on these modulations of the carrier signal, payment reader 22 and a contactless device are able to communicate information such as payment information.

In an embodiment, contactless interface 102 may include additional front end circuitry coupled to an antenna of contact interface 102 for improving NFC performance of payment reader 22. For example, contactless interface 102 may comprise various components for generating a field for facilitating NFC communication, such as with payment device 10, such as matching circuitry, electromagnetic interference (EMI) filters, or otherwise. As described in greater detail below, in some embodiments, contactless interface 102 may comprise a tuning circuit for tuning transmission signals. The tuning circuit may facilitate adjustment of a phase of a transmission signal provided to contactless interface 102 for transmission, such as by enabling variation of a voltage of a capacitor of the tuning circuit. Based on the variation, a phase of the transmission signal may be shifted as desired before the transmission signal is provided to the antenna of contactless interface 102 for transmission. In addition, contactless interface 102 may comprise phase adjustment circuitry for modifying and facilitating voltage applied to components of contactless interface 102, such as voltage provided to the tuning circuit and antenna. In some embodiments, the circuitry may comprise a power control circuit or similar circuitry for facilitating application of voltage across the tuning circuit and antenna of contactless interface 102.

In some embodiments, contactless interface 102 may further comprise sense circuitry for measuring characteristics of an NFC transmitted signal from the antenna of the contactless interface 102. As described in further detail below, in an embodiment, the sense circuitry may include components and hardware for measuring a voltage of the transmitted signal at the antenna of contactless interface 102. In some embodiments, the sense circuit may provide the voltage measurement of the transmitted signal to reader chip 100, and reader chip 100 may determine a phase of the transmitted signal based on the measurement.

Contact interface 104 may be a suitable interface for providing power to a payment chip such as an EMV chip of a chip card 14 and communicating with the EMV chip. Contact interface 104 may include a plurality of contact pins (not depicted in FIG. 3) for physically interfacing with the chip card 14 according to EMV specifications. In some embodiments, contact interface 104 may include a power supply (VCC) pin, a ground (GND) pin, a reset (RST) pin for resetting an EMV card, a clock (CLK) pin for providing a clock signal, a programming voltage (VPP) pin for providing a programming voltage to an EMV card, an input output (I/O) pin for providing for EMV communications, and two auxiliary pins. In this manner, the payment reader and the chip card 14 are able to exchange information such as payment information. Note that, in some embodiments, contact interface 104 may be housed on reader chip 100 and may communicate with the various components of reader chip 100 via any suitable means (e.g., a common internal bus).

Power supply 106 may include one or more power supplies such as a physical connection to AC power, DC power, or a battery. Power supply 106 may include power conversion circuitry for converting an AC or DC power source into a plurality of DC voltages for use by components of payment reader 22. When the power supply 106 includes a battery, the battery may be charged via a physical power connection, via inductive charging, or via any other suitable method. Although not depicted as physically connected to the other components of the payment reader 22 in FIG. 3, power supply 106 may supply a variety of voltages to the components of the payment reader 22 in accordance with the requirements of those components.

Wireless communication interface 108 may include suitable wireless communications hardware (e.g., antennas, matching circuitry, etc.) and one or more processors having processing capability necessary to engage in wireless communication (e.g., with a merchant device 29 via a protocol such as Bluetooth low energy) and control associated circuitry, including but not limited to hardware logic, computer readable instructions running on a processor, or any suitable combination thereof. Although wireless communication interface 108 may be implemented in any suitable manner, in an exemplary embodiment, wireless communication interface 108 may be implemented as a Texas Instruments CC2640 device, which may include a processing unit (not depicted) and memory (not depicted).

Wired communication interface 110 may include any suitable interface for wired communication with other devices or a communication network, such as USB, Lightning, FireWire, HDMI or mobile HDMI, Ethernet, any other suitable wired communication interface, or any combination thereof. In some embodiments, wired communication interface 110 may allow payment reader to communicate with one or both of merchant device 29 and payment server 40.

In some embodiments, reader chip 100 may include a signal conditioning device 112 coupled to the contactless interface 102 to process signals provided to and received from the contactless interface 102. Although signal conditioning device 112 may include any suitable hardware, software, or any combination thereof, in an exemplary embodiment signal conditioning device may comprise an FPGA. Signal conditioning device 112 may condition sent and received signals to and from contactless interface 102, such as when a payment device 10 using NFC communication communicates with payment reader 22. In an embodiment, signal conditioning device 112 may operate based on instructions stored at reader chip 100 (e.g., signal conditioning instructions 136) for use in interacting with the contactless interface 102.

In some embodiments, reader chip 100 may include a phase control circuit 116 for measuring and adjusting a phase difference of signals provided to and transmitted by NFC communication components of payment reader 22, such as may be present in contactless interface 102. Although phase control circuit 116 may be implemented in hardware or software and may include components or circuitry for performing signal phase measurement and adjustment functions described herein, in an embodiment, phase control circuit 116 may include a binary phase detection circuit, analog filtering circuit, phase detection circuitry, comparison circuit and decision circuit, as described hereafter in greater detail with regard to FIGS. 5-7.

In some embodiments, reader chip 100 may include a contactless power supply circuit 118. Contactless power supply circuit 118 may include a power source for providing a high voltage (e.g., 50 volts) to power the transmit circuit and antenna of the contactless interface in order to transmit a signal based on a provided transmit signal (e.g., a wireless carrier signal or wireless data signal that is output from the reader chip 22 at a lower voltage and power). In an embodiment, the contactless power supply circuit may also include a current monitor that is dedicated to measure a value that is representative of the current that is supplied to the transmit circuit and antenna.

In some embodiments, general memory 122 may be any suitable memory as described herein, and may include a plurality of sets of instructions for controlling operations of payment reader 22 and performing general transaction processing operations of payment reader 22, such as operating instructions 130, transaction processing instructions 132, data authentication instructions 134, signal conditioning instructions 136, and antenna tuning instructions 138.

Operating instructions 130 may include instructions for controlling general operations of the payment reader 22, such as internal communications, power management, processing of messages, system monitoring, sleep modes, user interface response and control, operation of the contact interface 104, the wireless interface 108, the wired interface 110, or the signal conditioning device 112, and the management of the other sets of instructions. In one embodiment, the operating instructions 130 may provide the operating system and applications necessary to perform most of the processing operations that are performed by the processing unit 120 of the reader chip 100 of payment reader 22.

Operating instructions 130 may also include instructions for interacting with a merchant device 29. In one embodiment, the merchant device 29 may be running a point-of-sale application. The operating instructions 130 may include instructions for a complementary application to run on processing unit 120 of reader chip 100, in order to exchange information with the point-of-sale application. For example, the point-of-sale application may provide a user interface that facilitates a user such as a merchant to engage in purchase transactions with a customer. Menus may provide for the selection of items, calculation of taxes, addition of tips, and other related functionality. When it is time to receive payment, the point-of-sale application may send a message to the payment reader 22 (e.g., via wireless interface 108). The operating instructions 130 facilitate processing of the payment, for example, by acquiring payment information via the contactless interface 102 or contact interface 104, and invoking the various resources of reader chip 100 to process that payment information (e.g., by executing instructions stored in cryptographic memory 128 using cryptographic processing unit 125), and by generating responsive messages that are transmitted to the point-of-sale application of the merchant device 29 via wireless communication interface 108 and wired communication interface 110.

Operating instructions 130 may also include instructions for interacting with a payment service system 50 at a payment server 40. In one embodiment, a payment service system 50 may be associated with the payment reader 22 and the point-of-sale application of the merchant device 29. For example, the payment service system 50 may have information about payment readers 22 and merchant devices 29 that are registered with the payment service system 50 (e.g., based on unique identifiers). This information may be used to process transactions with servers of the merchant and customer financial institutions, for providing analysis and reports to a merchant, and aggregating transaction data. The payment reader 22 may process payment information (e.g., based on operation of reader chip 100) and communicate the processed payment information to the point-of-sale application, which in turn communicates with the payment service system 50. In this manner, messages from the payment reader 22 may be forwarded to the payment service system 50 of payment server 40, such that the payment reader 22 and payment service system 50 may collectively process the payment transaction.

Transaction processing instructions 132 may include instructions for controlling general transaction processing operations of the payment reader 22, such as controlling the interaction between the payment reader 22 and a payment device 10 (e.g., for interfacing with a payment device via the contactless interface 102 and contact interface 104), selecting payment processing procedures (e.g., based on a payment processing entity associated with a payment method), interfacing with the cryptographic processor 125, and any other suitable aspects of transaction processing.

Transaction processing instructions 132 also may include instructions for processing payment transactions at payment reader 22. In one embodiment, the transaction processing instructions may be compliant with a payment standard such as those promulgated by EMV. Depending on the payment method that is being used (e.g., Europay, Mastercard, Visa, American Express, etc.), a particular processing procedure associated with the payment method may be selected and the transaction may be processed according to that procedure. When executed by processing unit 120, these instructions may determine whether to process a transaction locally, how payment information is accessed from a payment device, how that payment information is processed, which cryptographic functions to perform, the types of communications to exchange with a payment server, and any other suitable information related to the processing of payment transactions. In some embodiments, transaction processing instructions 132 may perform high level processing, and provide instructions for processing unit 120 to communicate with cryptographic processing unit 125 to perform most transaction processing operations. In addition, transaction processing instructions 132 may provide instructions for acquiring any suitable information from a chip card (e.g., via contact interface 104 and cryptographic processing unit 125) such as authorization responses, card user name, card expiration, etc.

Data authentication instructions 134 may include instructions for providing configuration information for a payment terminal 20. The configuration information may include any suitable information, such as payment limits and types of transactions for local transactions (i.e., transactions that occur without contacting a payment server 40) and supported applications. As an example, in some embodiments, data authentication instructions 134 may include configuration instructions such as TMS-CAPK instructions. In some embodiments, the TMS-CAPK may be tailored for a particular jurisdiction (e.g., country-specific).

Signal conditioning instructions 136 may include instructions for conditioning signals received from a payment device 10 via the contactless interface 102 (e.g., from a NFC payment device 10). Although in some embodiments, signal conditioning instructions 136 may include instructions for manipulating signals received via contactless interface 102, signal conditioning instructions 136 may include instructions for conditioning signals, including signals that are initially processed by signal conditioning hardware, such as signal conditioning device 112.

Antenna tuning instructions 138 may include instructions for performing tuning of an antenna of payment reader 22, such as NFC antenna of contactless interface 102 for communicating via NFC transmissions. One or more signals (e.g., a transmission source signal) may be generated at reader chip 100 and provided to contactless interface 102 for transmission (e.g., as a transmitted signal). In some embodiments, payment reader 22 may communicate with other devices (e.g., payment device 10) via NFC communication protocol using inductive coupling. As noted herein, a payment reader 22 may generate a field for providing a carrier signal (13.56 MHz) and sending and receiving data with another device via modulation of the carrier signal. However, in some instances the phase of the transmission source signal generated by a signal generator may differ from the phase of the transmitted signal (e.g., as the signal is modulated, filtered, and processed by tuning circuitry). In some embodiments, antenna tuning instructions 138 may be implemented in hardware, but in an embodiment, antenna tuning instructions 138 may be implemented in software and stored in memory 122.

In some embodiments, processing unit 120 may execute antenna tuning instructions 138 to set a desired phase shift of a transmitted signal from payment reader 22. A phase shift of the transmitted signal may be implemented by adjusting the operation of tuning components such as by modifying a voltage provided to a variable capacitance capacitor of the tuning circuit. A phase reference signal voltage may be selected and set (e.g., as a threshold) using a reference signal modification circuit (described in further detail below with reference to FIG. 5), and the phase of the transmitted signal may be shifted using a phase adjustment circuit (described in further detail below with reference to FIG. 5) to alter voltage provided to the tuning circuit to match the desired phase difference as indicated by the phase reference signal. The transmitted signal may be processed along with the transmission source signal and filtered using processing and filtering circuitry, as described below, to produce an analog phase signal representative of the phase difference between the two signals. The phase reference signal voltage and voltage of the analog phase signal may be compared (e.g., by the phase detection circuit) and an output indicative of the comparison may be output (e.g., a binary output). In this regard, antenna tuning instructions 138 may include instructions for adjusting the phase of the transmitted signal based on the comparison.

As an example, antenna tuning instructions 138 may include instructions for determining whether a voltage provided by the phase adjustment circuit is above or below a voltage set by selecting a node of the reference signal modification circuit that corresponds to a desired phase shift of the transmitted signal. The determination may be based on a comparison of a voltage of the analog phase signal with a voltage of a phase reference signal from the node of the reference signal modification circuit (e.g., whether the analog phase signal voltage is above or below the phase reference signal voltage). In some embodiments, antenna tuning instructions 138 may include instructions for determining that the analog phase signal voltage is below the voltage of the phase reference signal based on the output of the phase detection circuit (e.g., a binary output). In some embodiments, an output of binary "zero" may indicate that a voltage of the analog phase signal is below the desired voltage threshold selected using the reference signal modification circuit, as indicated by the voltage of the phase reference signal, and indicating that the actual phase difference is less than the phase difference associated with the reference signal. An output of binary "one" may indicate that the analog phase signal voltage is above the voltage of the phase reference signal. If the transmitted signal voltage is below the desired voltage of the phase reference signal, processing unit 120 may determine that the phase shift of the transmitted signal is below the desired phase shift, and may increment a voltage of a phase adjustment signal. If the transmitted signal voltage is above the desired voltage of the phase reference signal, processing unit 120 may decrement the voltage of the phase adjustment signal.

In an embodiment, the voltage may be incremented or decremented until the voltage of the transmitted signal corresponds to the desired voltage indicated by the phase reference signal (e.g., by identifying a high-resolution step change in which the output of the comparator changes). In some embodiments, processing unit 120 may increment or decrement a voltage of the reference signal modification circuit or phase adjustment circuit by selecting a corresponding node, as described further below. In this regard, processing unit 120 may vary the voltage provided from the phase adjustment circuit to the tuning circuit so that it converges on the desired transmit signal voltage. Note that, in some embodiments, antenna tuning instructions 130 may comprise instructions for converging on the desired voltage using one or more search techniques (e.g., binary or linear searching, interpolation or otherwise). In some embodiments, processing unit 120 may perform any of these operations by executing instructions stored as antenna tuning instructions 138, but the instructions may be stored in any one or more locations in other embodiments.

Antenna tuning instructions 138 also may include instructions for identifying a phase shift present in a transmitted signal. Processing unit 120 may vary a voltage of the phase reference signal by selecting nodes of the reference signal modification circuit. Phase detection circuit may output a binary output indicating whether the voltage of the phase reference signal falls below or exceeds the voltage of the analog phase signal. Based on antenna tuning instructions 138, processing unit 120 may continue to vary the voltage of the phase reference signal until it converges on the voltage value of the analog phase signal, as indicated by the output of the phase detection circuit. In some embodiments, antenna tuning instructions 138 may comprise instructions implementing any search technique (e.g., binary or linear searching, interpolation or otherwise) for determining the voltage of the analog phase signal by varying the voltage of the phase reference signal. Once the phase reference signal value that corresponds to the analog phase signal is determined.

Antenna tuning instructions 138 may also include instructions for utilizing a measure of the power usage of the contactless interface 120 (e.g., a measured current from contactless power supply 118) to modify the operation of the contactless interface 120. In some embodiments, it may be possible to modify the operation of the contactless interface 102, for example, to adjust a phase shift between a signal supplied to the transmit circuit and the signal transmitted by the antenna. In some embodiments, a number of iterations may be applied to the modifiable components (e.g., a variable capacitor) and the power used by the contactless interface may be measured (e.g., based on current draw). The measured power usage may be used to set the values for the modifiable components, or in some embodiments, to establish other desired values (e.g., a desired phase shift). In an exemplary embodiment of setting values for modifiable components, a number of power usage values may be associated with modifiable component values. The modifiable component values may be set based on a desired power usage value (such as a minimum value of the power usage values). In some embodiments, such measurements may be made on occasion (e.g., periodically) to confirm and update the values for the modifiable components. In some embodiments, the operating conditions of the payment reader may be known (e.g., that a NFC device or particular type of NFC device is communicating with the payment reader) and power draw (and/or, in some embodiments, phase difference) may be measured based on operating conditions of interest. In an embodiment, a number of operating conditions of interest may be identified and the values of the modifiable components may be changed based on the operating conditions.

In an embodiment, antenna tuning instructions 138 may combine power draw and phase difference measurements. Although the measurements may be combined in a variety of manners, in an exemplary embodiment the power draw (e.g., current) measurement process may be performed to identify conditions under which a minimum power draw is experienced. Phase shift measurements may also be associated with the power draw measurements. A desired phase shift may then be set based on the phase shift that is associated with the minimum power draw. The power draw measurement may be used to set the desired phase in the manner occasionally, for example, during factory testing, at startup, periodically during operation, and at other suitable times. The desired phase shift (which is not dependent on load and environmental conditions) may then be used to modify the values of the modifiable components during normal operation of the payment reader.

Cryptographic processing unit 125 may be any suitable a processor as described herein, and, in some embodiments, may perform cryptographic functions for the processing of payment transactions. For example, in some embodiments a cryptographic processing unit 125 may encrypt and decrypt data based on one or more encryption keys, in a manner that isolates the encryption functionality from other components of payment reader 22 and protects the encryption keys from being exposed to other components of payment reader 22.

In some embodiments, cryptographic memory 128 may be any suitable memory or combination thereof as described herein, and may include a plurality of sets of instructions for performing cryptographic operations, such as payment processing instructions 176 and cryptographic instructions 178. Payment processing instructions 176 may include instructions for performing aspects of payment processing, such as providing for encryption techniques to be used in association with particular payment procedures, accessing account and processing information, any other suitable payment processing functionality, or any suitable combination thereof. Cryptographic instructions 178 may include instructions for performing cryptographic operations. Cryptographic processing unit 125 may execute the cryptographic instructions 178 to perform a variety of cryptographic functions, such as to encrypt, decrypt, sign, or verify a signature upon payment and transaction information as part of a payment transaction.

Figure 4:
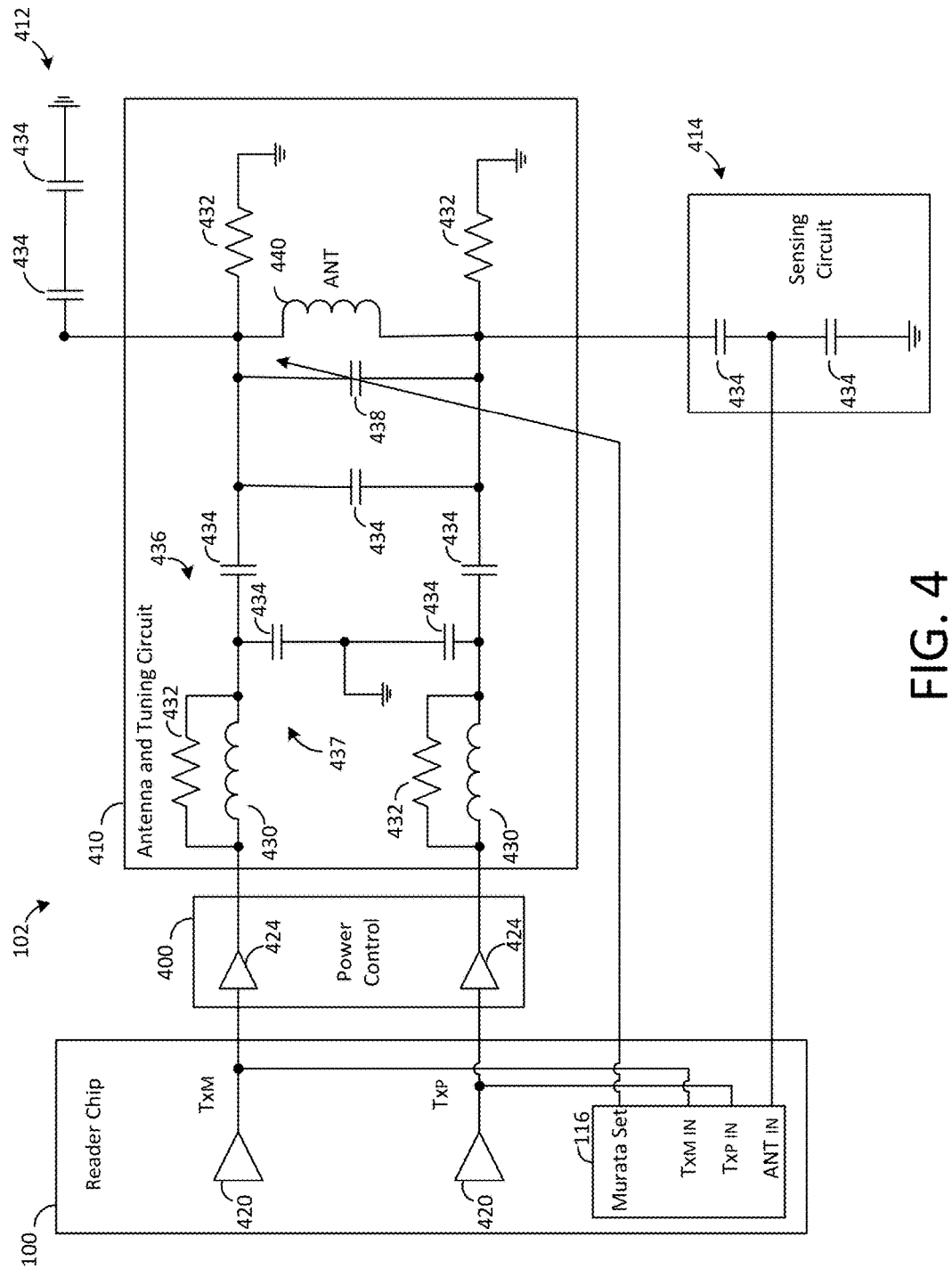
FIG. 4 depicts an exemplary reader chip and contactless interface in accordance with some embodiments of the present disclosure.

FIG. 4 depicts an exemplary reader chip and contactless interface in accordance with some embodiments of the present disclosure. In the embodiment of FIG. 4, the components of reader chip 100 and contactless interface 102 may be depicted as appearing in a particular configuration and arrangement, and comprising particular components, but it will be understood that other combinations and arrangements of components may be possible for achieving the functionality described herein in other embodiments. In some embodiments, contactless interface 102 may include a power control circuit 400, tuning circuit 410, replica circuit 412 and sense circuit 414.

In the embodiment of FIG. 4, reader chip 100 comprises phase control circuit 116, a plurality of transmit pins (e.g. TxM and TxP) and a plurality of buffers 420. In some embodiments, phase control circuit 116 may comprise various hardware and components, described in greater detail below, for performing phase measurement and adjustment. In an embodiment, phase control circuit 116 may comprise a plurality of pins for providing and receiving signals from various components of payment reader 22 and resources of reader chip 100. Each signal may have a power, amplitude, frequency, phase, duty cycle and waveform. Phase control circuit 116 may include Murata Set, TxM input, TxP input and ANT input pins, though phase detection circuit may comprise any number of pins in other embodiments. Murata Set pin may be coupled to tuning circuit 410 and may output a signal from phase control circuit 116 for controlling a voltage applied to a variable capacitance capacitor of tuning circuit 410. TxM input pin and TxP input pin may be coupled to one or more transmission lines for receiving a transmission source signal generated at reader chip 100 for transmission via contactless interface 102. ANT input pin may be coupled to sense circuit 414, and may receive a signal from sense circuit indicative of a measurement of a transmitted signal from the antenna of the contactless interface 102. Each of the foregoing pins may receive or provide other signals from or to other components or resources in other embodiments.

In some embodiments, contactless interface 102 may include a power control circuit 400 for altering a transmit signal provided from reader chip 100 for transmission via contactless interface 102. In some embodiments, power control circuit 400 is implemented in hardware and includes circuitry (e.g., H-Bridge circuitry 424) for boosting a signal provided by reader chip 100. In other embodiments, power control circuit 400 may be implemented in hardware or software and may include any components for altering a signal provided from reader chip 100 to contactless interface 102.

Tuning circuit 410 may be coupled to reader chip 100, power control circuit 400, and antenna 440 and may include components for providing a tuned transmission signal for transmission via the antenna 440. In some embodiments, tuning circuit 410 may be implemented in hardware and may include one or more inductors 430, resistors 432, capacitors 434 and variable capacitance capacitors 438. The inductors 430, resistors 432 and capacitors 434 of tuning circuit may be arranged in one or more matching circuits, electromagnetic interference (EMI) filters, or otherwise. In the embodiment of FIG. 4, a plurality of inductors 430, resistors 432, and capacitors 434 are arranged to perform a combination of functions, including those of an EMI filter circuit 436 (e.g., reducing electrical noise within the matching circuit and near antenna 440) and matching network 437 (e.g., matching a source impedance to load impedance). The plurality of inductors 430, resistors 432, and capacitors 434 may be arranged in other configurations and other numbers of each are in other embodiments. In some embodiments, each of inductors 430, resistors 432, and capacitors 434 may include conventional hardware, and may have fixed or variable respective inductance, resistance, or capacitance values. In the embodiment of FIG. 4, each of inductors 430, resistors 432 and capacitors 434 has a fixed inductance, resistance, and capacitance values.

In an embodiment, the transmit signal may be provided to the antenna 440 via tuning circuit 410. In the embodiment of FIG. 4, variable capacitor 438 may be coupled to phase control circuit 116 (e.g., via Murata Set pin or otherwise), and may modify the phase of the output signal by modifying the capacitance for the variable capacitor 438. The phase adjustment signal may have a value (e.g., voltage) to adjust a capacitance of variable capacitor 438. Variations in the capacitance of capacitor 438 may enable tuning circuit 410 to shift of a phase of a transmission source signal received from reader chip 100 to generate a tuned transmitted signal. The tuned transmission signal may be provided for transmission to the antenna 440 coupled to the tuning circuit 410.

As an example, in some embodiments, payment reader 22 may communicate via NFC communication (e.g., modulation of an inductively coupled carrier signal) with a payment device 10. A transmission source signal may include modulations of the carrier signal for transmission to the payment device 10 and may comprise a phase, frequency, power, or otherwise. Reader chip 100 may generate and provide the transmission source signal to tuning circuit 410 (via power control circuit 400). Tuning circuit 410 may tune the transmission source signal based on components of the tuning circuit, such as by adjusting a phase of the transmission source signal based on the voltage of the variable capacitance capacitor 438. Tuning circuit 410 may provide the tuned transmission signal from the transmission source signal to antenna 440, which may transmit the tuned transmission signal. In other embodiments, tuning circuit 410 may tune the transmission source signal using other components, hardware, software, or otherwise, and may provide the tuned transmission signal to other components or perform other tuning of the transmission source signal prior to or subsequent to transmission from antenna 440.

Replica circuit 412 may include hardware for compensating electrical effects of signals provided to tuning circuit 410 and antenna 440 (e.g., transmission source signal and tuned transmission signal). In some embodiments, replica circuit 412 includes one or more capacitors arranged in series and coupled to ground, although replica circuit 412 may comprise any components in any arrangement in other embodiments.

Sense circuit 414 may be implemented in hardware and coupled to antenna 440 and phase control circuit 116 (e.g., via ANT input pin). In some embodiments, sense circuit 414 may measure characteristics of a signal transmitted from antenna 440, such as the tuned transmission signal from the tuning circuit 410 (e.g., a voltage or phase of the tuned transmission signal when transmitted by antenna 440). In this regard, a measurement of characteristics of signals transmitted by antenna 440 may be provided to reader chip 100 for processing (e.g., to phase control circuit 116). In some embodiments, sense circuit 414 may include one or more capacitors 434 for enabling measurement of the transmitted signal from the antenna 440, but in other embodiments, sense circuit 414 may include other components or hardware. Note that the transmitted signal may have a transmitted signal phase, and that sense circuit 414 may include any necessary components for accurately capturing the phase of the transmitted signal and providing a representative signal to reader chip 100 (e.g., to ANT input pin of phase control circuit 116).

Figure 5:
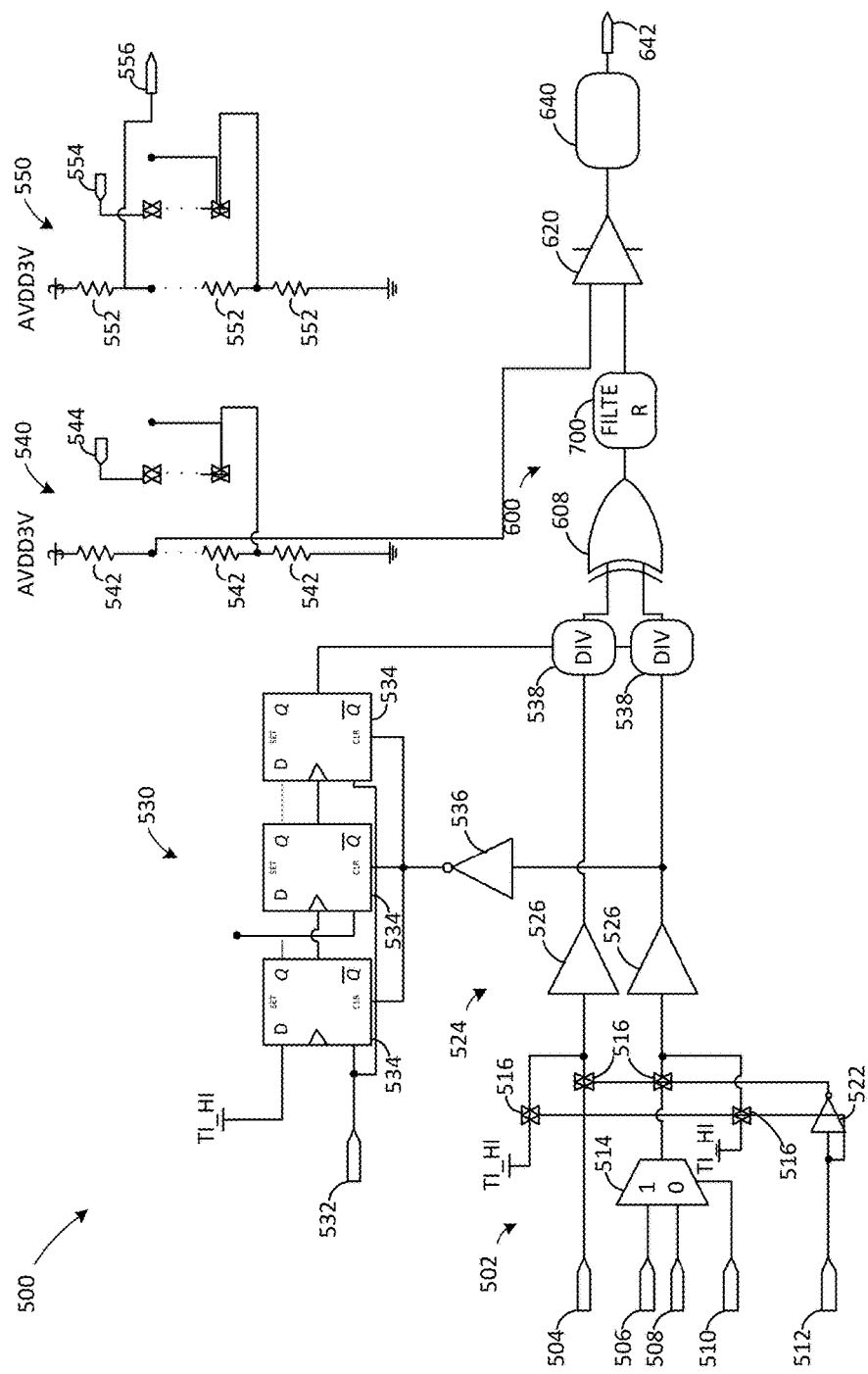
FIG. 5 depicts an exemplary transmit phase control circuit in accordance with some embodiments of the present disclosure.

FIG. 5 depicts an exemplary transmit phase control circuit 500 in accordance with some embodiments of the present disclosure. In some embodiments, transmit phase control circuit 500 may be housed on reader chip 100, may be implemented in hardware or software, and may include components for performing of functionality phase control circuit 116 described herein. Although particular components are depicted and configured in a particular arrangement in FIG. 5 it will be understood that other combinations and arrangements of components, hardware, software, or otherwise may be possible for achieving the functionality of transmit phase detection circuit 500 described herein.

In some embodiments, transmit phase control circuit 500 may include a signal selection circuit 502 for receiving signals from pins of phase control circuit 116 (e.g., Murata Set, TxM input, TxP input and ANT input pins). In some embodiments, signal selection circuit 502 may include a plurality of inputs for receiving signals provided to phase control circuit 116. The inputs may include ANT input 504, TxP input 506, TxM input 508, Tx Select input 510, and Mute input 512. ANT input 504 may receive a signal provided from sense circuitry 414 to ANT input pin of phase control circuit 116, such as the measured transmitted signal from sense circuitry 414. Similarly, TxP input 506 and TxM input 508 may receive a signal provided from reader chip 100 to the TxP and TxM input pins, such as the transmission source signal. Tx Select input 510 may receive a selection signal provided to selection circuit 514, such as from processing unit 120 of reader chip 100. Note that, in the embodiment of FIG. 5, selection circuit 514 is implemented in hardware and depicted as a conventional two-input multiplexer, but any hardware or software may be implemented for selecting and providing a source transmission signal from TxP and TxM input pins in other embodiments. In addition, Mute input 512 may provide a mute signal to one or more transmission lines coupled to any of ANT input 504, TxP input 506, TxM input 508, or Tx Select input 510 for opening a circuit such that the signal is not provided to other circuitry. In some embodiments, the mute signal from Mute input 512 may be provided to the one or more transmission lines based on toggling of one or more bypasses 516 based on an enabling input (e.g., TI_HI), such as may be received from processing unit 120 based on instructions implemented in hardware or software.

In some embodiments, the phase control circuit 500 may include processing circuitry 524 coupled to each of ANT input 504, selection circuit 514, and Mute input 512, such that the processing circuitry 524 may remove noise from the signals that are provided from these inputs. In an embodiment, processing circuitry 524 may include one or more comparators 526. As shown by FIG. 5, one comparator 526 may be coupled to receive the transmission source signal (e.g., from TxP input 506 or TxM input 508 via selection circuit 514) and another comparator 526 may be coupled to receive the measured transmitted signal (e.g., from ANT input 504). In some embodiments, each comparator 526 may comprise a Schmitt trigger for converting each of the measured transmitted signal and transmission source signal from an analog signal into a digital signal while removing or reducing noise from each signal. Each comparator 526 may comprise other hardware, software or combination thereof in other embodiments. The comparator 526 processing measured transmitted signal may output a processed measured transmitted signal and the comparator 526 processing the transmission source signal may output a processed transmission source signal.

Divider circuit 530 may be coupled to receive the processed transmission source signal, and may function to preserve phase characteristics of a signal while rejecting duty cycle distortion. In some embodiments, divider circuit 530 may comprise a reset input 532, one or more state storage circuits 534, a logic gate 536 and a plurality of signal dividers 538. A state storage circuit 534 may comprise components for storing a state of a signal (e.g., input TI_HI), such as provided from signal input, and may alter its state based on a provided clock source signal. In some embodiments, the provided clock source signal may be the processed transmission source signal, but other clock source signals may be provided in other embodiments. In addition, divider circuit 530 may have a plurality of state storage circuits 534, and may include a reset input 532 for providing a reset signal and controlling each of the plurality of state storage circuits 534.

As depicted by FIG. 5, an output signal of a final state storage circuit 534 may be provided to each of signal dividers 538. A signal divider 538 may include components for dividing a frequency of a signal (e.g., reducing the signal's frequency or duty cycle). In the embodiment of FIG. 5, a signal divider 538 is coupled to receive each of the processed transmission source signal and processed measured transmitted signal. When a signal divider 538 receives the output signal from the final state storage circuit 534 (e.g., a binary 1 pulse), the signal divider 538 may activate to divide an input signal (e.g., the processed transmission source signal or processed measured transmitted signal) received by the signal divider 538. In some embodiments, a signal divider 538 may output a signal in a manner that retains phase information for both input signals. In some embodiments, after signal divider 538 receives and divides the signals, the divided signals may be provided for further processing.

In some embodiments, transmit phase control circuit 500 may include a reference signal modification circuit 540 for selecting a voltage of a phase reference signal and providing a phase reference signal that is proportional to a known phase difference to binary phase detection circuit 600. In some embodiments, reference signal modification circuit 540 may include a plurality of resistors 542, which may be arranged in series or another configuration for dividing a voltage (e.g., from input AVDD3V3). In some embodiments, the plurality of resistors 542 may be arranged in a ladder configuration with a plurality of nodes representing known phase differences. The plurality of resistors 542 and nodes may be coupled to permit selection of a signal provided to the reference signal modification circuit 540 having a desired voltage value (e.g., based on the known phase difference represented by each node). Phase reference selection input 544 may be coupled to the plurality of nodes of reference signal modification circuit 540 and may select a node corresponding to a desired phase difference (e.g., based on a voltage at the node) that will be proportionally represented by phase reference signal. Phase reference selection input 544 may select a node based on a phase adjustment signal provided from decision circuitry 640, as described further below. In an embodiment, reference signal modification circuit 540 may provide a phase reference signal to comparison circuit 620 for comparison with an analog phase signal, as described below. Additional inputs, outputs and components of reference signal modification circuit 540 may be possible in other embodiments.

Transmit phase control circuit 500 may include a phase adjustment circuit 550 for selecting a voltage of a phase adjustment signal and providing the phase adjustment signal to tuning circuit 410 (e.g., to variable capacitance capacitor 438). Similar to reference signal modification circuit 540, in some embodiments, phase adjustment circuit 550 may include a plurality of resistors 552 and may be arranged in series or other configuration for dividing a voltage (e.g., AVDD3V3). In some embodiments, the plurality of resistors 552 may be arranged in a ladder configuration with a plurality of nodes and coupled to permit selection of a signal provided to the phase adjustment circuit 550 having a desired voltage value. Phase adjustment selection input 554 may be coupled to the plurality of nodes of phase adjustment circuit 550 and may select a node corresponding to a desired voltage for a phase reference signal. Phase adjustment selection input 554 may select a node based on a signal provided based on an output from decision circuitry 640, as described further below. In an embodiment, phase adjustment circuit 550 may provide a phase adjustment signal to tuning circuit 410 for adjusting voltage provided to variable capacitance capacitor 438, thereby adjusting a phase of the tuned transmission signal transmitted from antenna 440. Additional inputs, outputs and components of phase adjustment circuit 540 may be possible in other embodiments.

In some embodiments, binary phase detection circuit 600 may be coupled to divider circuit 530, reference signal modification circuit 540, and phase adjustment circuit 550 for receiving the processed measured transmitted signal and processed transmission source signal, receiving a phase reference signal, and providing a phase adjustment signal. Binary phase detection circuit 600 may comprise phase detection circuitry 608, analog filtering circuit 700, comparison circuitry 620, decision circuitry 640 and adjustment output 642. Exemplary embodiments and operations of the binary phase detection circuit 600 will be further described with reference to FIGS. 6 and 7.

Figure 6:
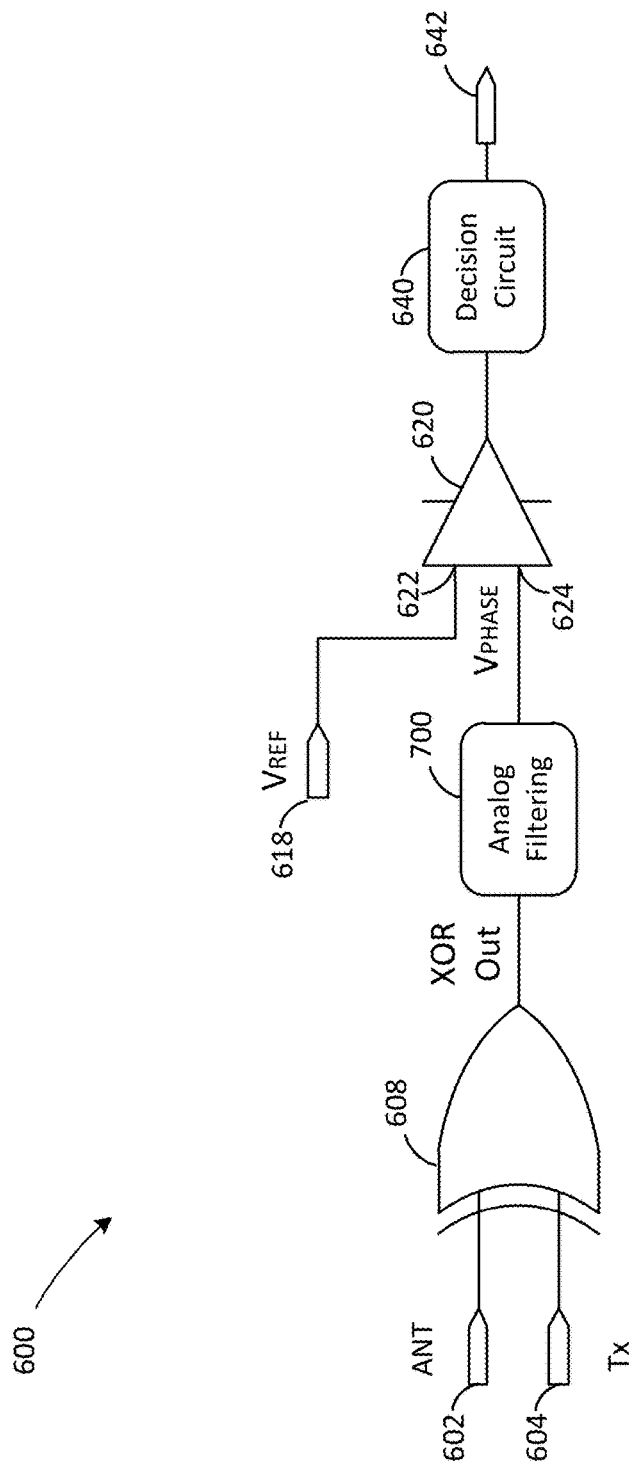
FIG. 6 depicts an exemplary binary phase detection circuit in accordance with some embodiments of the present disclosure.

FIG. 6 depicts an exemplary binary phase detection circuit 600 in accordance with some embodiments of the present disclosure. Binary phase detection circuit 600 may include various components for receiving the measured transmitted signal and transmission source signal, comparing a difference in phase between the processed measured signal and the processed transmission source signal, filtering the signals using an analog filter, comparing the analog phase signal with a phase reference signal, and generating an output to adjust operation of one or more components of the system based on the comparison. In an embodiment, binary phase detection circuit 600 may include a measured signal input 602, source signal input 604, phase detection circuitry 608, phase reference input 618, comparison circuitry 620, decision circuitry 640, and adjustment output 642. Binary phase detection circuit 600 may be implemented in hardware or software, and although FIG. 6 depicts components of binary phase detection circuit 600 implemented in a combination of hardware and software, in some embodiments, binary phase detection circuit 600 may be implemented in one or a combination of hardware, software or otherwise.

Measured signal input 602 of binary phase detection circuit 600 may be coupled to receive a first signal representative of the measured transmitted signal. In some embodiments, the first signal received by measured signal input 602 may comprise the processed measured transmitted signal received from divider circuit 538. Measured signal input 602 may be coupled to phase detection circuitry 608 to provide the first signal for comparison as described further below (e.g., to determine a phase difference between the first signal and a second signal). Measured signal input 602 may receive other signals in other embodiments.

Source signal input 604 may be coupled to receive a second signal representative of the transmission source signal. In some embodiments, the second signal received by source signal input 604 may include the processed transmission source signal received from divider circuit 538. Source signal input 604 may be coupled to phase detection circuitry 608 to provide the second signal for comparison with the first signal, as described below. Source signal input 604 may receive other signals in other embodiments.

Phase detection circuitry 608 may be coupled to receive the first signal from measured signal input 602 and the second signal from source signal input 604, to compare a phase of the first signal with a phase of the second signal, and to output a phase difference signal when the received signals are at different relative voltage levels. In some embodiments phase detection circuitry 608 may be implemented with one or more digital logic gates, for example, to operate as an exclusive-or (XOR) logic gate that outputs a high or logical one signal when the input values to the logic gate differ. In other embodiments, phase detection circuitry 608 may include different logic gates, and may include a combination of one or more logic gates to achieve the functionality described herein.

In an embodiment, phase detection circuitry 608 may output a phase difference signal having a duty cycle that is proportional to a phase difference between the source signal phase (e.g., indicated by the first signal) and transmitted signal phase (e.g., indicated by the second signal). In an embodiment, a phase difference signal generated by XOR logic may output a signal that is high when the phases of the input signals (e.g., measured signal input 602 and the second signal provided by the source signal input 604) are different, and low when the phases of the input signals are the same (e.g., both either high or low). A duty cycle of the phase difference signal may change based on the relative values of the first signal and second signal, such as whether the first signal and second signal are associated with different logical values. For example, when waveforms of the first signal and second signal are perfectly in phase (e.g., phase difference is zero degrees), the phase difference signal output by phase detection circuitry 608 may have a 0% duty cycle. When waveforms of the first signal and second signal are 180 degrees out of phase (e.g., phase difference is 180 degrees), the phase difference signal output by phase detection circuitry 608 may have a 100% duty cycle.

As a further example, when waveforms of the first signal and second signal are out of phase by 90 degrees (e.g., phase difference is 90 degrees), the phase difference signal output by phase detection circuitry 608 may have an average logic value (e.g., a corresponding duty cycle) of logic one divided by two (e.g., reflecting comparison of phases of the first signal and second signal). In this regard, the phase difference signal output by phase detection circuitry 608 may comprise a 50% duty cycle. Although certain examples of the functionality of phase detection circuitry 608 have been provided for the sake of efficiency, it will be understood that, in some embodiments, other components and techniques for comparing a difference in phase between the first signal provided by a measured signal inputs 602 and the second signal provided by the source signal input 604 are possible. The results of the comparison performed by phase detection circuitry 608 may be output as a phase difference signal and provided to analog filtering circuit 700 additional processing.

In an embodiment, analog filtering circuit 700 may be coupled to phase detection circuit 608 and may receive the phase difference signal. As described below, analog filtering circuit 700 may perform various filtering and processing of the phase difference signal, and may generate an analog phase signal based on the duty cycle of the phase difference signal. As described in greater detail below, in an embodiment analog filtering circuit 700 may generate an analog phase signal having a voltage level that is based on the duty cycle the phase difference signal generated by phase detection circuitry 608 (e.g., such that a higher voltage level represents a greater phase difference, and vice versa), and provide the analog phase signal to a comparison circuit 620.

In some embodiments, a comparison circuit may be utilized to perform a signal comparison between the analog phase signal and a reference signal in order to perform operations based on a measured phase difference. In an embodiment, an exemplary comparison circuit 620 may comprise components for comparing the analog phase signal from the analog filtering circuit 700 to a reference signal, such as provided by reference signal modification circuit 540. In some embodiments, comparison circuit 620 may be implemented in hardware or software or a combination thereof, and may include various components for achieving the functionality described here and assigned to comparison circuitry 620. Comparison circuit 620 may include reference signal input 622 and analog phase signal input 624. The reference signal input 622 may be coupled to receive a phase reference signal from reference signal modification circuit 540 (e.g., via reference signal input 618), and analog phase signal input 624 may be coupled to receive analog phase signal from analog filtering circuit 700.

Comparison circuit 620 may output a comparison signal based on the comparison of the analog phase signal and phase reference signal. In an exemplary embodiment, the comparison signal may perform provide a binary output value based on a comparison between the analog phase signal and the reference signal, while in other embodiments, the comparison outputs may be provided (e.g., a signal proportional to a difference between the reference signal and the analog phase signal). For example, in some embodiments, comparison circuit 620 may output a comparison signal with a low value corresponding to a binary value of zero if, based on the comparison, a value of the analog phase signal (e.g., voltage level) does not exceed a value of the same characteristic of the phase reference signal. If comparison circuit 620 determines that the value of the characteristic (e.g., voltage level) of the analog phase signal does exceed the value of the same characteristic of the phase reference signal, the comparison circuit 620 may output a comparison signal having a high value corresponding to a binary value of 1. In other embodiments, the logical output may be switched, e.g., such that an output of 1 corresponds to the voltage of the analog phase signal exceeding value of the reference signal.

In some embodiments, the output comparison circuit 620 may be coupled to provide the comparison signal to decision circuit 640 for evaluation and use in generating and providing a phase adjustment signal or modification signal, as described herein. In other embodiments, comparison circuit 620 may perform other or additional comparisons between characteristics of the analog phase single and reference signal, and may provide additional outputs to other components of the system. Decision circuit 640 may include components for receiving a comparison signal from comparison circuitry 620 and adjusting the operation of one or more components of the of binary phase detection circuit 600 based on the comparison, including adjustment output 642. Although decision circuit 640 may be implemented in one or a combination of hardware or software, in an embodiment, decision circuit 640 may be implemented in firmware and may be stored in memory 122 on reader chip 100 as antenna tuning instructions 138 (FIG. 3). Other configurations and implementations of decision circuit 640 are possible in other embodiments.

In some embodiments, based on the phase difference signal from phase detection circuit 608, decision circuit 640 may adjust operations of various components of binary phase detection circuit 600, including phase adjustment circuit 550 and reference signal modification circuit 540. In some embodiments, decision circuit 640 may be coupled to provide signals to the various components of payment reader 22 for adjusting their operations as desired (e.g., via adjustment output 642). Examples of adjustments provided by decision circuit 640 to each of phase adjustment circuit 550 and reference signal modification circuit 540 will be discussed in turn, but it will be understood that, in some embodiments, decision circuit may perform adjustment of different operations of the phase adjustment circuit 550 and reference signal modification circuit 550, and may adjust operations of other or additional components. In addition, decision circuit 640 may perform adjustment based on other signals than the phase difference signal, comparison signal, or otherwise in some embodiments.

In an embodiment, decision circuit 640 may adjust operation of the phase adjustment circuit 550 to adjust a phase of the transmitted signal. Decision circuit 640 may provide a phase adjustment signal to circuitry such as phase adjustment circuit 550 based on the phase difference signal (e.g., as indicated by the comparison signal from comparison circuit 620). In some embodiments, the phase difference signal may comprise an estimate of the phase difference between the first signal and second signal, as noted above with regard to phase detection circuit 608. In this regard, the phase adjustment signal provided by decision circuit 640 may be based on an estimate of the phase difference (e.g., indicated by phase adjustment signal).

In some embodiments, the phase adjustment signal from decision circuitry 640 may be provided to phase adjustment circuit 550, such as via adjustment output 642, which may be coupled to provide the phase adjustment signal (e.g., to phase adjustment selection input 554). The phase adjustment signal may include information for selecting a node of the phase adjustment circuit 550 corresponding to a desired phase of the transmitted signal. Note that the phase adjustment signal may be provided based on the analog phase signal and the reference signal. For example, as described below with regard to analog filtering circuit 700, analog phase signal may be based on a duty cycle of the phase difference signal provided to comparison circuit 620 from phase detection circuit 608. The analog phase signal from analog filtering circuit 700 may have an amplitude that is proportional to a phase difference between the source signal phase and transmitted signal phase. Decision circuitry 640 may determine, based on the analog phase signal, the phase difference between the source signal phase and transmitted signal phase. Decision circuit 640 may provide a phase adjustment signal to phase adjustment circuit 550 for adjusting the phase of the transmitted signal.

Decision circuit 640 may continue adjusting the phase of the transmitted signal via the phase adjustment circuit 550 until a phase of the transmitted signal matches a desired phase or until a phase difference between the analog phase signal and phase reference signal falls below a threshold difference. In some embodiments, decision circuit 640 may determine a phase adjustment signal to provide to phase adjustment circuit 550 based on previous values of the comparison signal. Decision circuit 640 may use a search procedure, such as a linear search procedure, binary search procedure, or otherwise. In some embodiments, a linear search procedure may comprise selecting a phase adjustment signal that reduces the phase difference by a fixed amount (e.g., reduction by one half or other value) in order to reduce a phase difference between the analog phase signal and reference signal (as indicated by a value of the comparison signal). In this regard, decision circuit 640 may compare a value of the comparison signal against previous values of the comparison signal to determine a phase adjustment signal to provide to the phase adjustment circuit 550. In some embodiments, the comparison signal used by decision circuit 640 may be stored in memory of payment reader 22, such as general memory 122 of reader chip 100. In other embodiments, decision circuitry may perform other techniques for determining a phase adjustment signal, and may determine a phase adjustment signal based on other information.

In some embodiments, decision circuit 640 may adjust operation of the reference signal modification circuit 540 to modify a value of the reference signal, such as by providing a modification signal having a value that corresponds to a measured phase difference, such as may be indicated by phase difference signal from phase detection circuit 608. In some embodiments, decision circuit 640 may receive the comparison signal from comparison circuit 620 and generate and provide the modification signal to the reference signal modification circuit 540 based on the comparison signal. Decision circuit 640 also may determine a modification signal based on a current value of the reference signal and previous values of the comparison signal according to a search procedure as described above (e.g., linear, binary, or otherwise). For example, decision circuit 640 may modify the reference signal (e.g., by providing a modification signal) until the reference signal is within a threshold voltage of the analog phase signal. In some embodiments, decision circuit 640 may be coupled to provide the modification signal to reference signal modification circuit 540, such as via phase reference input 544. The modification signal may be provided to reference signal modification circuit 540 via other inputs in other embodiments.

Note that the threshold voltage may be based on a known resolution for the reference signal modification circuit 540. In some embodiments, various components of payment reader 22, such as reader chip 100, phase control circuit 116, and contactless interface 102, may comprise a processing delay (e.g., delay caused by hardware limitations when a component may be implemented in hardware). Cumulative processing delay of these components may limit a resolution with which signals may be provided from either of reference signal modification circuit 540 or phase adjustment circuit 550. For example, a propagation time for a signal, such as the reference signal or a transmission source signal generated for transmission via antenna 440 may be approximately 100 nanoseconds or some other delay value. In this regard, such delay may limit timeframes during which a may be voltage applied to a circuit, such as the reference signal modification circuit 540, or to a component, such as variable capacitance capacitor 438 via tuning circuit 410 (e.g., based on a modification signal or phase adjustment signal from decision circuit 640). In this manner, the decision circuit 640 may wait for measured or predetermined delay time before providing additional adjustments to adjust phase or modify the value of the reference signal.

Figure 7:
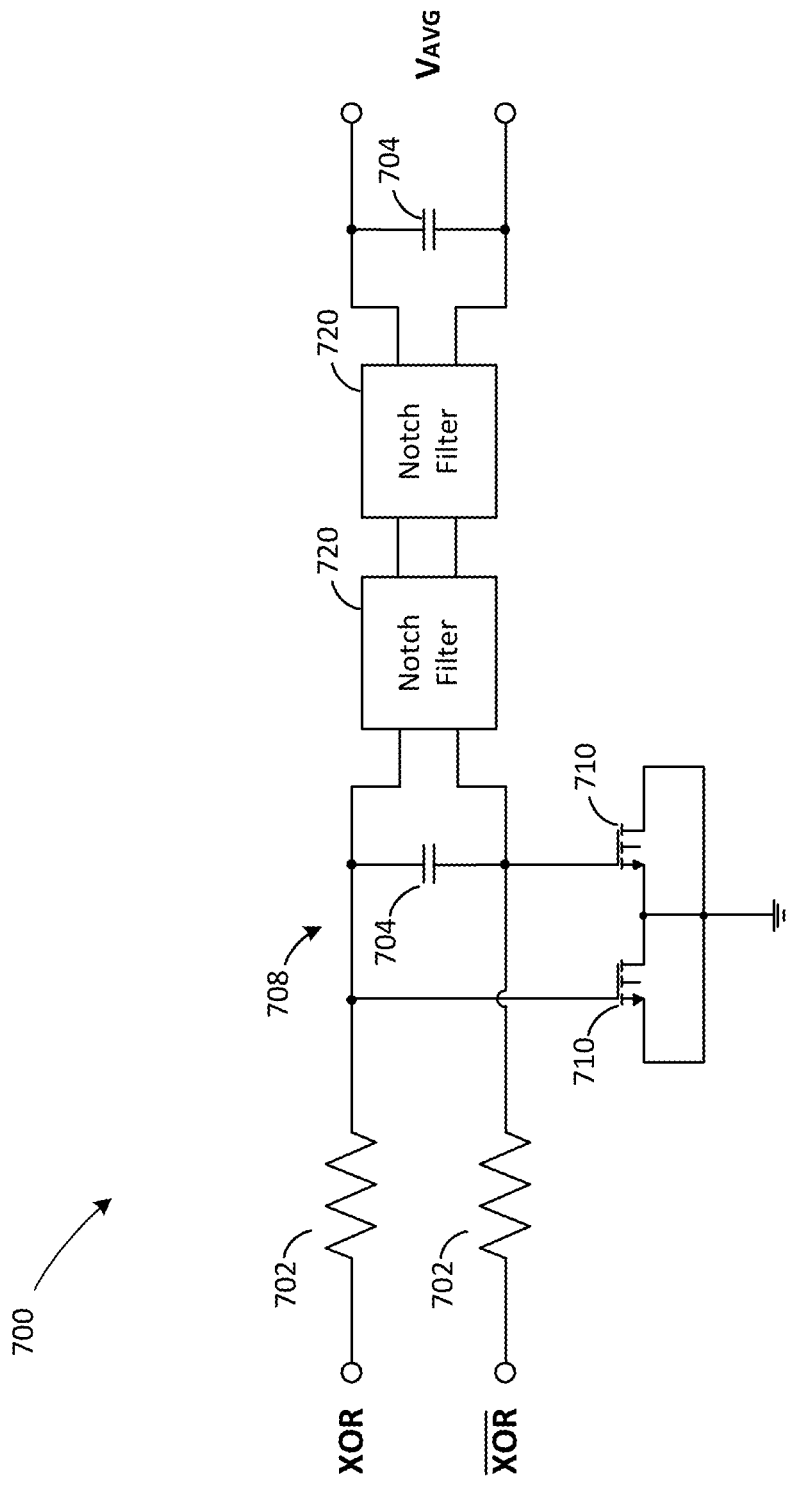
FIG. 7 depicts an exemplary analog filtering circuit in accordance with some embodiments of the present disclosure.

FIG. 7 depicts an exemplary analog filtering circuit 700 in accordance with some embodiments of the present disclosure. Analog filtering circuit 700 may be implemented in hardware and/or software, and may include components for generating an analog phase signal. In an embodiment, analog filtering circuit 700 may include at least one low pass filter 708 and one or more notch filters 720 for performing processing of a signal received by analog filtering circuit 700 (e.g., phase difference signal) and generating the analog phase signal. In some embodiments, analog filtering circuit 700 may be coupled to phase detection circuit 608 (FIG. 6) for receiving the phase difference signal and decision circuit 640 for providing the analog phase signal, although analog filtering circuit 700 may be coupled to other components and receive other signals in other embodiments.

One or more low-pass filters 708 may be implemented in hardware and may include one or more resistors 702, one or more capacitors 704 (e.g., for forming a RC filter), and one or more switches 710. In some embodiments, low-pass filter 708 receives the phase difference signal and filter frequencies from the phase difference signal based on a threshold of low-pass filter 708. That is, low-pass filter 708 may permit a signal having a frequency below the threshold of low-pass filter 708 to pass, while cutting off or attenuating a signal with a frequency above the low-pass filter 708 threshold. In this regard, low-pass filter 708 may remove noise from signals having a frequency that exceeds a desired threshold of low-pass filter 708. Thus, the one or more low-pass filters 708 may filter frequencies of the phase difference signal exceeding the threshold of low-pass filter 708 and allow the signal to pass to the one or more notch filters 720. In this regard, the analog phase signal generated by analog filtering circuit 700 may be generated based on the one or more low-pass filters 720.

One or more notch filters 720 may be implemented in hardware and may comprise components for processing the phase difference signal from low-pass filter 708. In some embodiments, low-pass filtering by the one or more low-pass filters 708 may be insufficient to eliminate noise present in a signal (e.g., ripples present in phase difference signal) that may corrupt a measurement or comparison of a phase of the signal. A notch filter 720 may have a stopband at a carrier frequency (e.g., NFC carrier frequency 13.56 MHz or other frequency) for rejecting undesired interference. Notch filter 720 eliminates a portion of a signal at a desired frequency within a stopband. In this regard, a notch filter 720 may comprise a stopband at a carrier frequency that is associated with the transmitted signal from antenna 440 (e.g., as indicated by the phase difference signal). Thus, the analog phase signal generated by analog filtering circuit 700 may be generated based on the one or more notch filters 720. Notch filter 720 may comprise additional stopbands or stopbands at other frequencies in other embodiments.

In an embodiment, the analog phase signal generated by analog filtering circuit 700 may have various characteristics and be based on one or more signals provided to the analog filtering circuit 700. In some embodiments, an amplitude of the analog phase signal may be proportional to the phase difference between the source signal and transmitted signal phase, such as may be indicated by the duty cycle of the phase difference signal from phase detection circuit 608. In some embodiments, the analog phase signal generated by passing the phase difference signal through the one or more low-pass filters 708 and one or more notch filters 720 may comprise an average value of a voltage the phase difference signal (e.g., based on its duty cycle). In this regard, the analog phase signal may be provided to permit other components of the binary phase detection circuit 600 to accurately estimate an average value of a voltage and duty cycle of the analog phase signal, such as for accurate comparison with one or more other signals. In some embodiments, the average value of the voltage and duty cycle of the analog phase signal may be compared with other values (e.g., a voltage or duty cycle of the reference signal), such as by comparison circuit 620.

Figure 8:
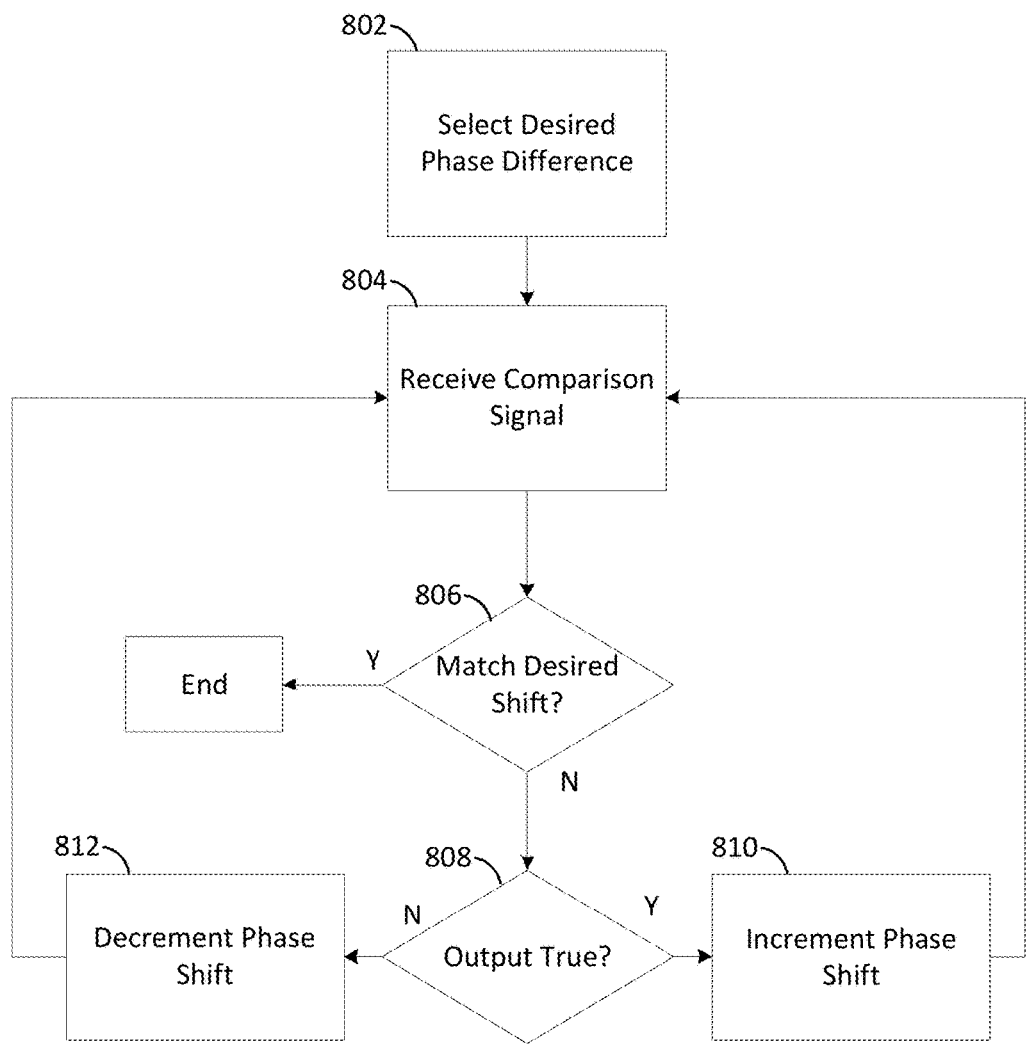
FIG. 8 depicts a non-limiting flow diagram illustrating exemplary methods for adjusting a phase difference of a measured transmitted signal in accordance with some embodiments of the present disclosure.

FIG. 8 depicts steps 800 of a non-limiting flow diagram illustrating exemplary methods for adjusting a phase difference of a measured transmitted signal in accordance with some embodiments of the present disclosure. In an embodiment, the steps of FIG. 8 may be directed to and performed by phase control circuit 500 for identifying a phase difference between a measured transmitted signal and transmission source signal. However, it will be understood that in some embodiments (not depicted in FIG. 8), the phase difference may be identified in other manners, as described herein.

At step 802, a desired phase difference between a phase of the measured transmitted signal and the transmission source signal may be selected, such as selection of a corresponding node of reference signal modification circuit by processing unit 120 when executing antenna tuning instructions 138. Although any desired phase difference may be selected, in some embodiments, processing unit 120 may select the desired phase difference based on a desired communication performance of the antenna 440 of payment reader 22, as may be affected by variations in components of the payment reader 22. In some embodiments, the desired phase difference may be selected to achieve other objectives, such as improving efficiency or otherwise (e.g., based on a phase difference associated with a minimum current measurement). Processing unit 120 may execute antenna tuning instructions 138 (e.g., including decision circuit 640 implemented in firmware) to provide a modification signal to the reference signal modification circuit 540 selecting a node for a phase reference signal that is proportional to the desired phase difference. The reference signal modification circuit 540 may output a reference signal corresponding to the selected node. After the desired phase difference has been selected, processing may continue to step 804.

At step 804, a comparison signal may be received, such as by decision circuit 640 (e.g., processing unit 120 executing antenna tuning instructions 138). In some embodiments, the comparison signal may be provided from a comparison circuit 620 coupled to compare a reference signal with an analog phase signal as described herein. The analog phase signal may be based on the duty cycle of a phase difference signal output by phase detection circuit 608, which may have a duty cycle that is proportional to a phase difference between the transmission source signal phase and the transmitted signal phase. An amplitude of the analog phase signal also may be proportional to the phase difference between the source signal phase and transmitted signal phase. In this regard, the comparison signal may correspond to the analog phase signal, and may permit a determination that the phase difference between the source signal phase and transmitted signal phase matches a desired phase difference. After the comparison signal has been received, processing may continue to step 806.

At step 806, an evaluation of the comparison signal may be performed by decision circuit 640 (e.g., by processing unit 120 executing antenna tuning instructions 138) to determine whether the phase difference indicated by the analog phase signal matches the desired phase difference within a desired resolution (e.g., as determined by a search technique such as a linear search technique). In an embodiment, if the binary value of the comparison signal has previously been "true" (e.g., high or one), and is now false (e.g., a low or zero), or vice versa, this may indicate that the latest modification of the transmission phase has crossed the value of the desired phase difference. If the resolution of the most recent change is less than a desired minimum value, this may indicate that the phase difference is within a desired value, and processing may end. If not, processing may continue to step 808.

At step 808, an evaluation may be performed, such as by decision circuit 640, of the comparison signal to determine whether a binary value of the comparison signal indicates a manner in which the phase difference should be changed (e.g., based on a search technique such as a linear search technique). For example, at step 808 it may be determined whether the phase shift should be increased or decreased, and in some embodiments, a resolution of how much the value should be increased or decreased (e.g., based on progress of the search technique). If the phase difference is to be increased (e.g., based on a "true" value indicating the current phase difference is less than a desired phase difference), processing may continue to step 810. If the phase difference is to be decreased (e.g., based on a "false" value indicating the current phase difference is greater than a desired phase difference), processing may continue to step 812.

At step 810, the phase difference between the transmitted signal phase and transmission source signal phase may be increased (e.g., by modifying a phase adjustment signal to the phase adjustment circuit 550 such as by incrementing a control signal based on the desired resolution of the phase difference increase) by a value based on an estimate of a phase difference that will match the desired phase difference. Although various increments are possible, in some embodiments, an increment may be selected (e.g., by decision circuit 640) based on a desired search procedure, such as a linear search procedure. In other embodiments, other search procedures may be used (e.g., iteratively stepping a phase difference up or down based on previous phase difference values until the phase difference matches the desired phase difference). For example, decision circuit 640 may increment a value of the phase difference between the measured transmitted signal phase and the transmission source signal phase based on previous values of the comparison signal. In an embodiment, the phase difference may be incremented by a fixed amount (e.g., an amount that is double or other multiple) of the value of a phase difference indicated by one or more previous values of the comparison signal. As an example, if the comparison signal indicates that a phase difference between the measured transmitted signal phase and the transmission source signal phase falls below a desired phase difference of 90 degrees (e.g., based on a previous resolution for phase changes), decision circuit 640 may provide a phase adjustment signal to the phase adjustment circuit 550 to increment a voltage applied to the phase adjustment circuit 550 (e.g., to variable voltage capacitor 438). After the phase shift (e.g., voltage) is incremented, processing may return to step 804.

At step 812, the phase difference between the measured transmitted signal phase and the source signal phase may be decreased (e.g., by modifying a phase adjustment signal to the phase adjustment circuit 550 such as by decrementing a control signal based on the desired resolution of the phase difference increase) by a value based on an estimate of a phase difference that will match the desired phase difference. Similar to the process described above with respect to step 810, decision circuit 640 may decrement a value of the phase difference between the measured transmitted signal phase and the transmission source signal phase based on previous values of the comparison signal. In an embodiment, the phase difference may be decremented by a fixed amount (e.g., an amount that is one half or other proportion) of the value of the phase difference indicated by one or more previous values of the comparison signal. As an example, if the comparison signal indicates that a phase difference between the measured transmitted signal phase and the transmission source signal phase exceeds a desired phase difference of 90 degrees (e.g., based on a previous resolution for phase changes), decision circuit 640 may provide a phase adjustment signal to the phase adjustment circuit 550 to decrement a voltage applied to the phase adjustment circuit 550 (e.g., to variable voltage capacitor 438). After the phase shift (e.g., voltage) is incremented, processing may return to step 804.

Figure 9:
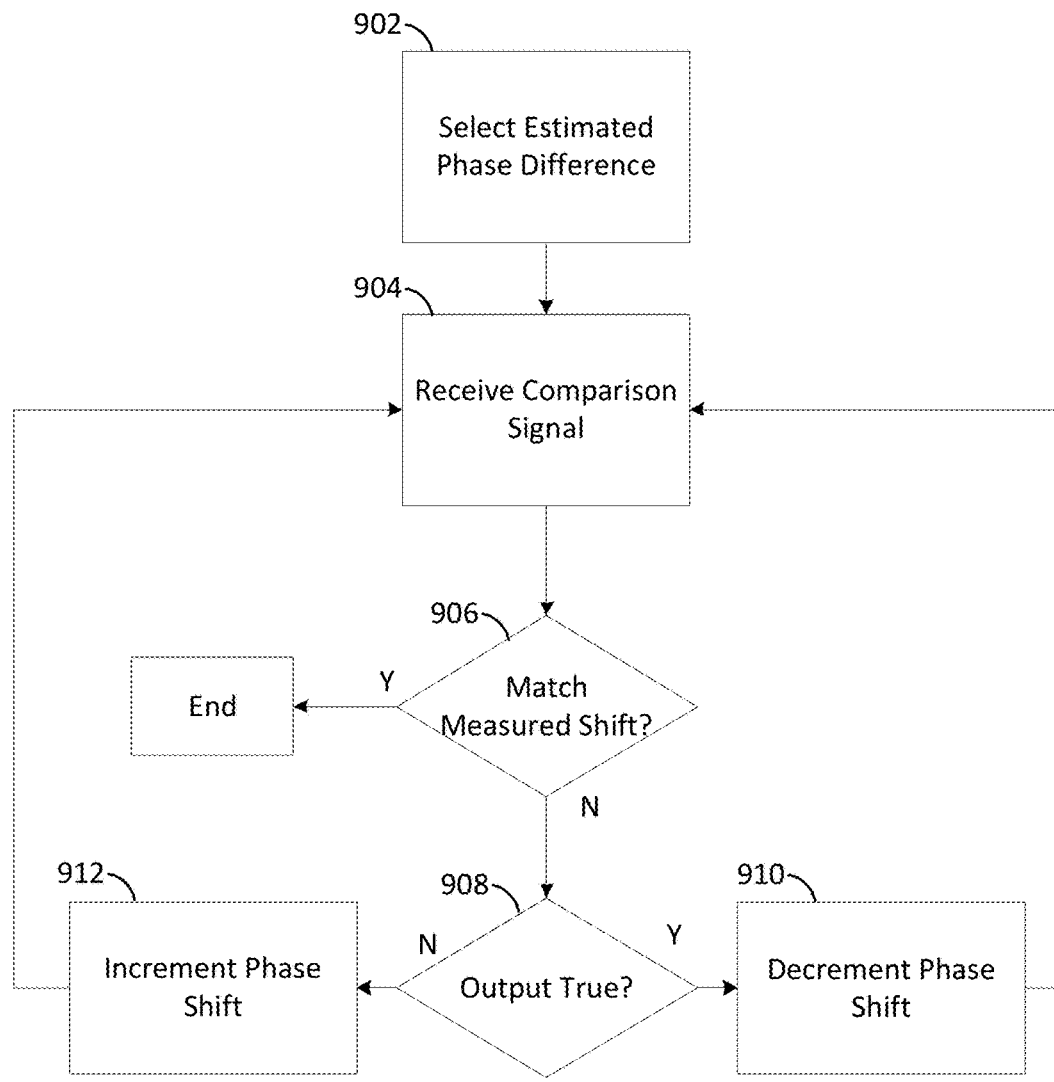
FIG. 9 depicts a non-limiting flow diagram illustrating exemplary methods for identifying a measured phase difference in accordance with some embodiments of the present disclosure.

FIG. 9 depicts steps 900 of a non-limiting flow diagram illustrating exemplary methods for identifying a measured phase difference in accordance with some embodiments of the present disclosure. In an embodiment, the steps of FIG. 9 may be directed to and performed by phase control circuit 500 for identifying a phase difference between a measured transmitted signal and transmission source signal. However, it will be understood that in some embodiments (not depicted in FIG. 9), the measured phase difference may be identified in other manners, as described herein.

At step 902, an estimated phase difference between a phase of the measured transmitted signal and the transmission source signal may be selected, such as selection of a corresponding node of reference signal modification circuit 540 by processing unit 120 when executing antenna tuning instructions 138. Although any estimated phase difference may be selected, in some embodiments, processing unit 120 may select the estimated phase difference to attempt to match the phase difference of the analog phase signal (e.g., as indicated by a voltage of the analog phase signal), such as for performing calibration, monitoring communication performance of the antenna 440 of payment reader 22 or otherwise. In some embodiments, the estimated phase difference may be selected to achieve other objectives, such as improving efficiency. Processing unit 120 may execute antenna tuning instructions 138 (e.g., including decision circuit 640 implemented in firmware) to provide a modification signal to the reference signal modification circuit 540 selecting a node for a reference signal that is proportional to the estimated phase difference. The reference signal modification circuit 540 may output a reference signal corresponding to the selected node. After the estimated phase difference has been selected, processing may continue to step 904.

At step 904, a comparison signal may be received, such as by decision circuit 640 (e.g., processing unit 120 executing antenna tuning instructions 138). In some embodiments, the comparison signal may be provided from a comparison circuit 620 coupled to compare a reference signal with an analog phase signal as described herein. The analog phase signal may be based on the duty cycle of a phase difference signal output by phase detection circuit 608, which may have a duty cycle that is proportional to a phase difference between the transmission source signal phase and the transmitted signal phase. An amplitude of the analog phase signal also may be proportional to the phase difference between the source signal phase and transmitted signal phase, and the comparison signal may be based on a comparison of this analog phase signal to the reference signal. After the comparison signal has been received, processing may continue to step 906.

At step 906, an evaluation of the comparison signal may be performed by decision circuit 640 (e.g., by processing unit 120 executing antenna tuning instructions 138) to determine whether the phase difference indicated by the reference signal matches the measured phase difference of the analog phase signal within a desired resolution (e.g., as determined by a search technique such as a linear search technique). In an embodiment, if the binary value of the comparison signal has previously been "true" (e.g., high or one), and is now false (e.g., a low or zero), or vice versa, this may indicate that the latest modification of the reference signal value has crossed the value of the actual phase difference as indicated by the analog phase signal. If the resolution of the most recent change is less than a desired minimum value, this may indicate that the phase difference is within a desired value, and processing may end. If not, processing may continue to step 908.

At step 908, an evaluation may be performed, such as by decision circuit 640, of the comparison signal to determine whether a binary value of the comparison signal indicates a manner in which the reference signal value should be changed (e.g., based on a search technique such as a linear search technique). For example, at step 908 it may be determined whether the reference signal value should be increased or decreased, and in some embodiments, a resolution of how much the value should be increased or decreased (e.g., based on progress of the search technique). If the reference signal value is to be increased (e.g., based on a "true" value indicating the current phase difference is less than a desired phase difference), processing may continue to step 910. If the phase difference is to be decreased (e.g., based on a "false" value indicating the current phase difference is greater than a desired phase difference), processing may continue to step 912.

At step 910, the reference voltage value may be decreased (e.g., by providing a modification signal to the reference signal modification circuit 540) based on an estimate of a phase difference that will match the desired phase difference. Although various increases (e.g., by incrementing) are possible, in some embodiments, an increment may be selected (e.g., by decision circuit 640) based on a desired search procedure, such as a linear search procedure. In other embodiments, other search procedures may be used (e.g., iteratively stepping a phase difference up or down based on previous phase difference values until the phase difference matches the desired phase difference). For example, decision circuit 640 may decrement a value corresponding to a change in reference value based on previous values of the comparison signal. In an embodiment, the phase difference may be decremented by a fixed amount (e.g., an amount that is double or other multiple) of the value of a phase difference indicated by one or more previous values of the comparison signal. As an example, if the comparison signal indicates that a phase difference between the reference signal and the analog phase signal falls below a desired resolution (e.g., based on a previous resolution for phase changes), decision circuit 640 may provide a modification signal to the reference signal modification circuit 540 to decrement a voltage of the reference signal provided to comparison circuit 620. After the reference value is decreased, processing may return to step 904.

At step 912, the measured phase difference may be increased (e.g., by incrementing a modification signal provided to the reference signal modification circuit 540) by a value based on an updated estimated reference value that will correspond to the measured phase difference as indicated by the analog phase signal. Similar to the process described above with respect to step 910, decision circuit 640 may increment a value of the estimated phase difference based on previous values of the comparison signal. In an embodiment, the estimated phase difference may be incremented by a fixed amount (e.g., an amount that is double or other multiple) of the value of the estimated phase difference indicated by one or more previous values of the comparison signal. After the reference value is increase, processing may return to step 904.

FIGS. 10A, 10B and 11 depict an exemplary antenna in accordance with some embodiments of the present disclosure. In the embodiments of FIGS. 10A, 10B and 11, the components of antenna 440 may be depicted as appearing in a particular configuration and arrangement, and comprising particular components, but it will be understood that other combinations and arrangements of components may be possible for achieving the functionality described herein in other embodiments. In some embodiments, antenna 440 may include a substrate 200, first and second circuit paths 212, 214, first and second antenna terminals 222, 224, and first and second through connections 232, 234.

The antenna 440 can include a substrate 200 having a first surface 202 (shown in FIG. 11) and a second surface 204 (shown in FIG. 11) that is on the opposite side of (or opposed to) the first surface 202. In one embodiment, substrate 200 is a flexible circuit board, flex circuit or flexible printed circuit board that can have one or more layers (e.g., 3 layers) with traces and/or components on each of the layers of the substrate. In other embodiments, the substrate 200 may be formed from other suitable materials or components (e.g., a printed circuit board). In the embodiment shown in FIGS. 10A, 10B and 11, the flexible printed circuit board 200 has a single layer. The flexible printed circuit board 200 can also provide for interconnections between the first surface 202 and the second surface 204 and for interconnections between the layers of the flexible printed circuit board 200 (if present).

In one embodiment, the first surface 202 can be a substantially planar surface and considered a "top surface" of the flexible printed circuit board 200 and the second surface 204 can be a substantially planar surface and considered a "bottom surface" of the flexible printed circuit board 200. However, the top and bottom surfaces may be reversed in another embodiment. The top surface 202 can include the first antenna terminal 222 and the second antenna terminal 224. The first and second antenna terminals 222, 224 can be connected to the tuning circuit 410 and receive the tuned transmission signal from the tuning circuit 410. In one embodiment, the flexible printed circuit board 200 can include an NFC interface (not shown) and corresponding traces or lines (not shown) that couple first and second antenna terminals 222, 224 on the flexible printed circuit board 200 to the tuning circuit 410 when the tuning circuit 410 is mounted on a different substrate from the flexible printed circuit board 200. In other words, the NFC interface on the flexible printed circuit board 200 can be used to connect components on different types of substrates.

As shown in FIG. 10A, the first antenna terminal 222 can be connected to the first circuit path or trace 212. The first circuit path 212 can be a single "loop" having multiple turns and be located on the top surface 202 of the flexible printed circuit board 200. The first circuit path 212 can end at the first through connection (or via) 232. The first through connection 232 travels from the top surface 202 through the body of the flexible printed circuit board 200 to the bottom surface 204. The first through connection can be used to serially connect the first circuit path 212 to the second circuit path 214. As shown in FIG. 10B, the first through connection 232 can be connected to the second circuit path 214. The second circuit path or trace 214 can be a single "loop" having multiple turns and be located on the bottom surface 204 of the flexible printed circuit board 200. The second circuit path 214 can end at the second through connection (or via) 234. In other embodiments, the first circuit path 212 and the second circuit path 214 can include multiple loops (i.e., 2 or more loops) with multiple turns arranged in a variety of suitable shapes with one or more of the loops located fully or partially in another of the loops. In some embodiments, each of the loops for one of the particular surface may have a similar shape, although in other embodiments different loops may have different shapes on the same surface. When the first circuit path 212 and the second circuit path 214 have multiple loops, a predetermined spacing can be used between individual loops to obtain a desired magnetic flux from the antenna. In still other embodiments, the first circuit path 212 and the second circuit path 214 can have any suitable shape with any number of turns (or no turns).

However the various loops and shapes thereof are arranged on each particular surface, the particular layout may be based on a desired overall flux characteristic resulting from the combination of the circuit paths on both circuits taking into account a desired flux pattern for interacting with other devices, dielectric properties of the substrate (e.g., flex circuit 200), and other similar factors. In some embodiments it may be desired that the overall shape and circuit path exhibited on each of the two surfaces is substantially identical and each circuit path has the same direction of current flow, such that the independent flux paths are substantially aligned within a region of interest, resulting in an overall flux pattern that provides maximum transmission efficiency within the region of interest.

The second through connection 234 travels from the bottom surface 204 through the body of the flexible printed circuit board 200 to the top surface 202. The second through connection 234 can be used to serially connect the second circuit path 214 to the second antenna terminal 224 located on the top surface 202 of the flexible printed circuit board 200. While the first and second antenna terminals 222, 224 are shown on the top surface 202 in the embodiment of FIG. 10A, the first and second antenna terminals 222, 224 may be located on the bottom surface 204 in another embodiment. In still other embodiments, the first antenna terminal 222 may be located on the top surface 202 and the second antenna terminal 224 may be located on the bottom surface 204, or the first antenna terminal 222 may be located on the bottom surface 204 and the second antenna terminal 224 may be located on the top surface 202.

As can be seen in FIGS. 10A and 10B, the single loop of the first circuit path 212 and the single loop of the second circuit path 214 can each have a substantially identical shape. In one embodiment, the first circuit path 212 and the second circuit path 214 can have a rectangular or quadrilateral shape. However, in other embodiments, the first circuit path 212 and the second circuit path 214 can have other geometric shapes (e.g., triangular shape, pentagonal shape, hexagonal shape, octagonal shape, circular shape, elliptical shape, oval shape, etc.) or non-geometric shapes. In addition, the second circuit path 214 can be positioned on the bottom surface 204 such that the second circuit path 214 substantially aligns (or stacks) vertically with the first circuit path 212. In other words, the second circuit path 214 can be positioned directly beneath the first circuit path 212 as shown in FIG. 11 for a substantially majority of the first circuit path 212. In other embodiments, the second circuit path 214 may have a different shape from the first circuit path 212 such that only portions of the second circuit path 214 are aligned or stacked vertically with the first circuit path 212.

The second circuit path 214 can be positioned on the bottom surface 204 and coupled to the first through connection 232 such that the flow of current through the second circuit path 214 from the first through connection 232 to the second through connection 234 is in the same direction as the current flowing in the first circuit path 212. By flowing the current in the first circuit path 212 and the second circuit path 214 in the same direction, the magnetic flux produced by each of the first circuit path 212 and the second circuit path 214 can combine such that the resultant magnetic flux from the antenna 440 is increased. The vertical aligning of the first circuit path 212 and the second circuit path 214 on opposite sides of the flexible printed circuit board 200 while also having current flow in the same direction can increase the current density for the antenna 440 because of the relatively small distance separating the first circuit path 212 and the second circuit path 214. In some embodiments, the distance separating the first circuit path 212 and the second circuit path 214, such as by utilizing minimum tolerances for the components creating the separation (e.g., a minimum flexible printed circuit board depth), which may further optimize the current density and magnetic flux of the aligned circuit paths.

Changes in the distance separating the first circuit path 212 and the second circuit path 214 can affect the current density and the magnetic flux produced by the antenna 440. In one embodiment, the distance separating the first circuit path and the second circuit path can correspond to the thickness of the flexible printed circuit board 200 as shown in FIG. 11. Because this thickness may vary due to manufacturing tolerances and other causes, in some embodiments tuning may be employed to compensate for effects of different distances between the first and second circuit paths.

By vertically aligning the first circuit path 212 and the second circuit path 214, the current density through the antenna 440 can be increased without increasing the size of the antenna 440. The increase in current density for the antenna 440 from the vertical alignment of the first circuit path 212 and the second circuit path 214 can result in a predetermined flux pattern with a stronger and more uniform magnetic flux in the magnetic field generated by the antenna 440. In addition, the magnetic field generated by the antenna 440 may also have a wider/larger distribution or size as a result of the increased magnetic flux from the antenna 440. In one embodiment when the first circuit path 212 and the second circuit path 214 are only partially aligned, as described above, the partial alignment areas can be used to provide specific flux patterns of increased magnetic flux in portions of the magnetic field generated by the antenna 440. Further, the tuning circuit 410 can be used, as described above, to adjust the tuned transmission signal provided to the antenna 440 to account for changes in the current density and/or magnetic flux of the antenna 440 caused by changes in the distance between the first circuit path 212 and the second circuit path 214 (e.g., a change in the distance resulting from the bending or flexing of the flexible printed circuit board 200).

Figure 12:
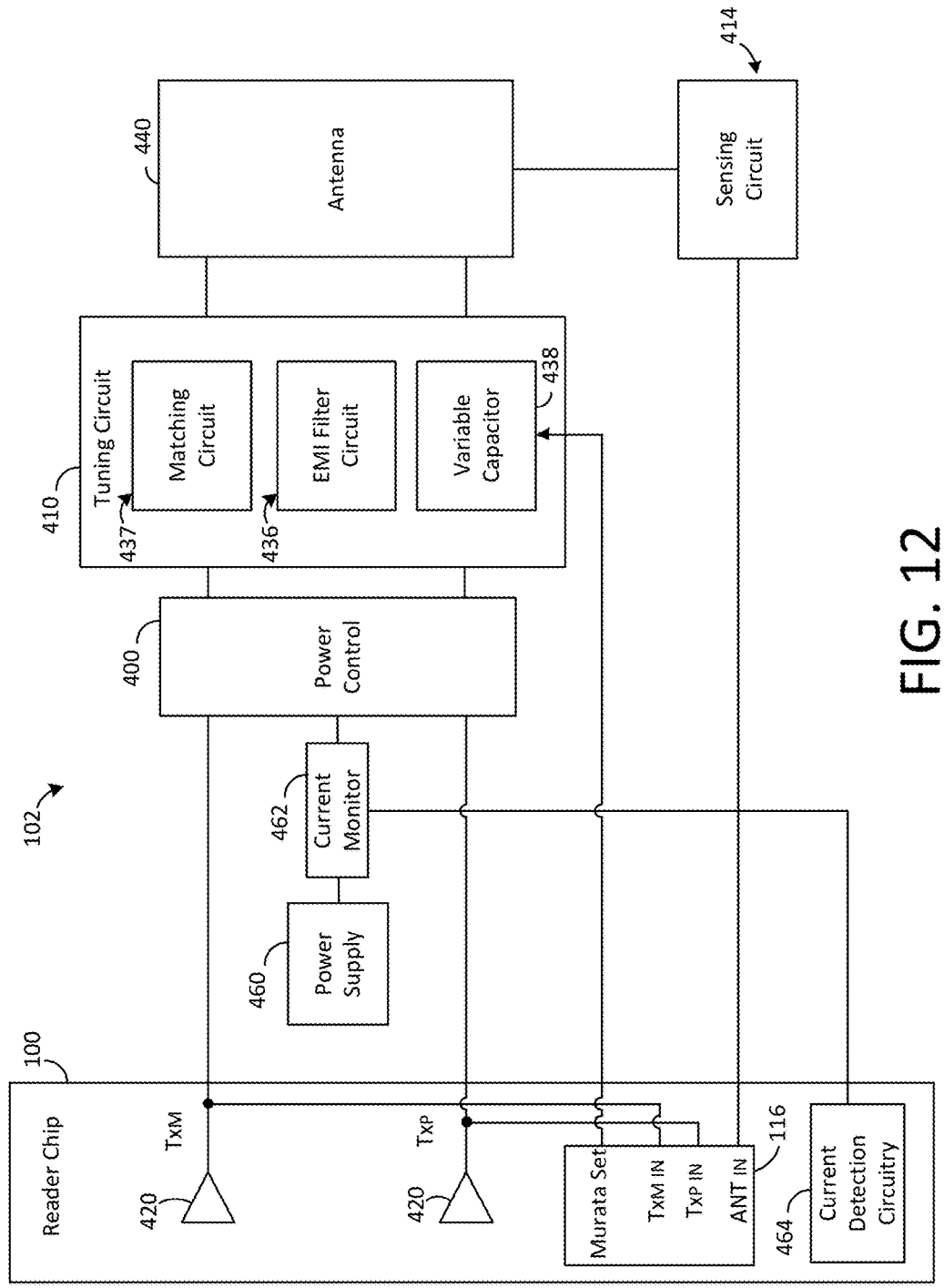
FIG. 12 depicts an exemplary reader chip and contactless interface in accordance with some embodiments of the present disclosure.

FIG. 12 depicts an exemplary reader chip and contactless interface in accordance with some embodiments of the present disclosure. In the embodiment of FIG. 12, the components of reader chip 100 and contactless interface 102 may be depicted as appearing in a particular configuration and arrangement, and comprising particular components, but it will be understood that other combinations and arrangements of components may be possible for achieving the functionality described herein in other embodiments. The reader chip 100 and the contactless interface 102 can have similar components (e.g., tuning circuit 410, antenna 440, sensing circuit 414 and buffers 420) that operate in a similar manner to those described above with respect to FIG. 4. In some embodiments, contactless interface 102 may include a power supply 460, a current monitor 462, power control circuit 400, tuning circuit 410 and sense circuit 414.

In the embodiment of FIG. 12, reader chip 100 includes phase control circuit 116, a plurality of transmit pins (e.g., TxM and TxP), a plurality of buffers 420 and a power measurement circuit such as a current detection circuit 464. The power measurement circuit may perform measurements that are indicative of the power being consumed by the transmit circuitry and antenna, such as the current detections circuit 464 depicted in the exemplary embodiment of FIG. 12. An exemplary current detection circuit 464 may include various hardware components for determining a current value that can be used to determine transmission efficiency of the transmit circuit and antenna 440, for example, to modify tuning of the antenna or to set target phase difference values. In an embodiment, current detection circuit 464 may include a plurality of pins for providing and receiving signals from various components of payment reader 22 and resources of reader chip 100. Each signal may have a power, amplitude, frequency, phase, duty cycle and waveform. Current detection circuit 464 may include one or more input pins to receive a current measurement from current monitor 462 and/or other components and one or more output pins to output a signal from current detection circuit 464 to one or both of the phase control circuit 116 and the tuning circuit 410 for controlling a voltage applied to a variable capacitance capacitor 438 of tuning circuit 410. Each of the foregoing pins may receive or provide other signals from or to other components or resources in other embodiments.

In some embodiments, contactless interface 102 may include a power supply 460 for adjusting the voltage of the transmit signal provided from reader chip 100 for transmission via contactless interface 102. In some embodiments, power supply 460 is implemented in hardware and includes a power source (e.g., power converted from a primary power source of the payment reader) and circuitry (e.g., a switching regulator, such as a buck regulator or a boost regulator, or a voltage regulator) for applying a required power to the signal (e.g., carrier signal or data signal) that is output by reader chip 100 for transmission. The contactless interface 102 can also include a power sensing circuitry such as a current monitor 462 to sense a current and provide a sensed current signal that is proportional to the power supplied (e.g. as represented by current to output a signal for transmission having a particular voltage) from the power supply 460. The sensed current signal from the current monitor 462 is provided to the current detection circuitry 464 on the reader chip 100.

The current detection circuitry 464 can then determine a current value based on the sensed current signal. The determined current value from the current detection circuitry 464 can then be provided to the phase control circuit 116 in one embodiment. The determined current value can be used by the phase control circuit 116 to generate the phase adjustment signal to be provided to the variable capacitor 438. In another embodiment, the current detection circuitry 464 can include corresponding hardware and/or software components to permit the current detection circuitry 464 to modify the tuning of the tuning circuit (e.g., by modifying the variable capacitor 438) based on the determined current value independent of the phase control circuit 116 (i.e., the current detection circuit 464 can generate the adjustment signal instead of the phase control circuit 116).

In one embodiment, the power supply 460 can provide an output signal at a predetermined frequency. The output signal from the power supply 460 can be in the form of a square wave with a corresponding pulse width. The pulse width in the square wave output signal can control the amount of current being provided to power control circuit 400. For example, the greater the pulse width in the square wave output signal, the more current that is being provided to the power control circuit 400 and the shorter the pulse width in the square wave output signal the less current that is being provided to the power control circuit 400. In addition, the pulse width in the square wave output signal corresponds to the DC level of the signal. In one embodiment, the current monitor 462 can include a low pass filter to extract the DC level of the square wave output signal from the power supply. The low pass filter may be implemented in hardware and may include one or more resistors, one or more capacitors (e.g., for forming a RC filter), and/or one or more switches. However, in other embodiments, different hardware configurations may be used for the low pass filter. The current detection circuitry 464 can include an analog to digital converter to read the signal from the current monitor 462 corresponding to the DC level of the square wave output signal provided by the power supply 460 and provide the determined current value since the DC level is related to the current (i.e., both values are dependent on the pulse width).

In other embodiments, the current monitor 462 may be positioned in a different location in the contactless interface 102 to monitor a different current of the contactless interface 102. The current monitor 462, regardless of its location, can provide the sensed current signal representative of transmission efficiency to the current detection circuitry 464. In still other embodiments, a separate current monitor 462 may not be used and existing components in the contactless interface 102 can provide a sensed current signal to the current detection circuitry 464. The current detection circuitry 464 can process the sensed current signal from the current monitor 462 or other component of the contactless interface 102 to obtain the determined current value.

In one embodiment, one or both of the current detection circuitry 464 and the phase control circuitry 116 can adjust the phase adjustment signal provided to the variable capacitor 438 to minimize the determined current value. The current detection circuitry 464 and/or the phase control circuitry 116 can evaluate the determined current value and make an adjustment to the phase adjustment signal to either raise or lower the capacitance of the variable capacitor 438 and thereby change the performance of the tuning circuit 410.

After the capacitance of the variable capacitor 438 has been changed, a new determined current value can be calculated as described above and then compared to the previous determined current value. If the new determined current value is less than the previous determined current value, the phase adjustment signal can be further modified to continue raising or lowering the capacitance of the variable capacitor 438 based on the previous modification to the phase adjustment signal. If the new determined current value is greater than the previous determined current value, the phase adjustment signal can be modified to change the capacitance of the variable capacitor 438 in the opposite manner from the previous adjustment. For example, if the current increased after lowering the capacitance of the variable capacitor 438, the phase adjustment signal would be set to raise the capacitance of the variable capacitor 438. The process of raising or lowering the capacitance of the variable capacitor 438 can be continuously performed to establish and maintain a minimum determined current level. In still another embodiment, the above process can be repeated to establish and maintain the minimum desired current level while also maintaining a predetermined phase difference. In other words, the minimum determined current level can be established and maintained relative to a predetermined phase difference.

In an embodiment, the transmit signal may be provided to the antenna 440 via tuning circuit 410. In the embodiment of FIG. 12, variable capacitor 438 may be coupled to phase control circuit 116 (e.g., via Murata Set pin or otherwise), and may modify the phase of the output signal by modifying the capacitance for the variable capacitor 438. The phase adjustment signal may have a value (e.g., voltage) to adjust a capacitance of variable capacitor 438 based on one or both of the phase difference and the determined current value. Variations in the capacitance of capacitor 438 may enable tuning circuit 410 to shift of a phase of a transmission source signal received from reader chip 100 to generate a tuned transmitted signal. The tuned transmission signal may be provided for transmission to the antenna 440 coupled to the tuning circuit 410.

Figure 13:
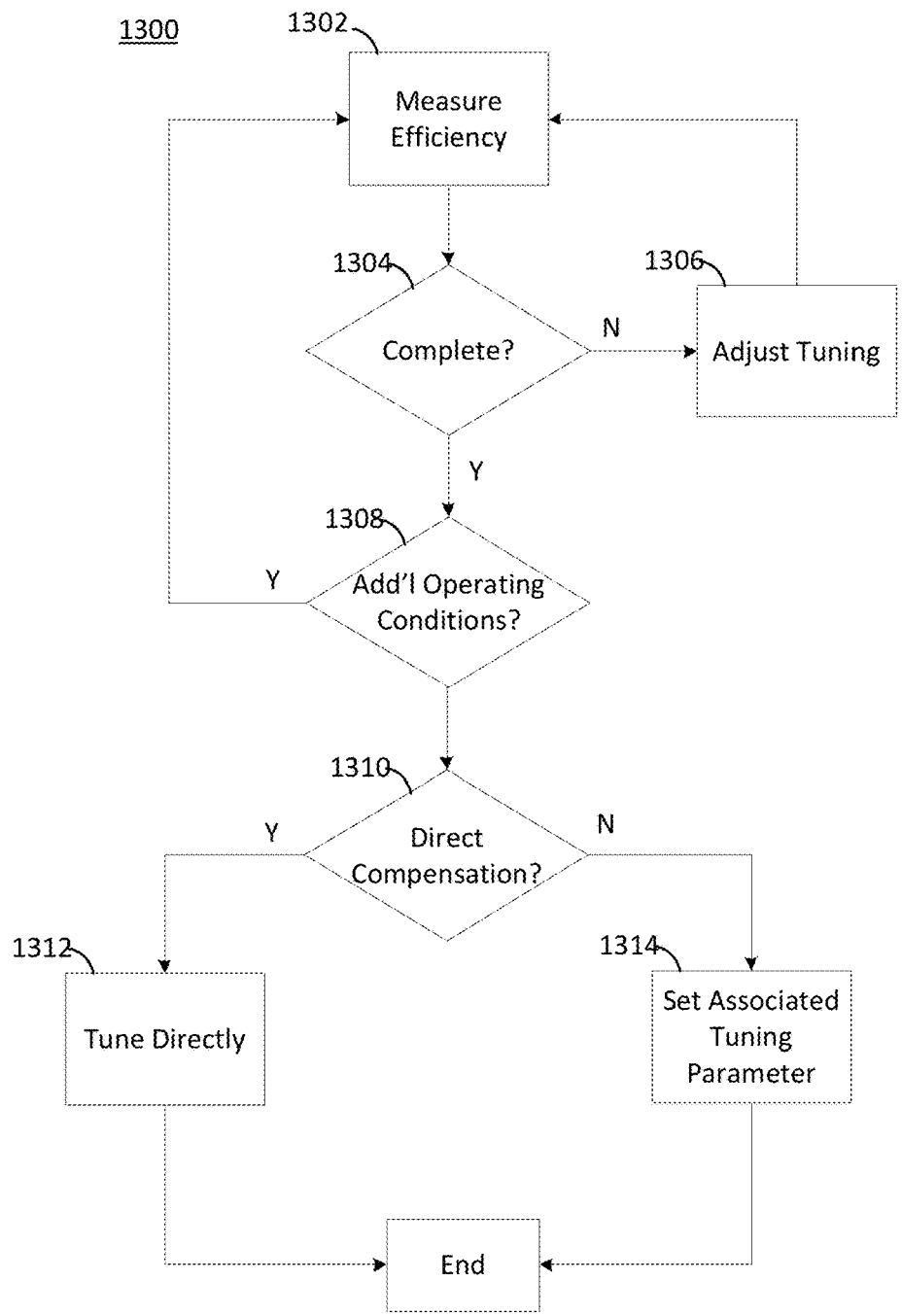
FIG. 13 depicts a non-limiting flow diagram illustrating exemplary methods for utilizing transmit efficiency of the transmit circuitry and antenna in accordance with some embodiments of the present disclosure.

FIG. 13 depicts a non-limiting flow diagram illustrating exemplary methods for utilizing transmit efficiency of the transmit circuitry and antenna in accordance with some embodiments of the present disclosure. In an embodiment, the steps of FIG. 13 may be directed to and performed by the circuitry depicted in FIG. 12, including, e.g., a current monitor 462 measuring power draw (e.g., current) by the transmit circuit and antenna, while current detection circuitry 464 detecting the measured current in a manner to allow modification of the operation of the tuning circuit (e.g., variable capacitor 438) based on analysis of the received current signal (e.g., by reader chip 100 controlling phase control circuit 116). However, it will be understood based on the present disclosure that the method of FIG. 13 may be performed in other manners using other suitable components.

At step 1302, a measure related to transmission efficiency (e.g., current supplied to the transmit circuit and antenna to provide the transmit signal) may be determined. The measurement may be performed as a single point measurement or over a period of time with statistical analysis to determine a measurement value for analysis. In some embodiments, the measurement may be timed for particular known operating conditions, for example, when a wireless carrier signal is being sent without an expectation of a significant inductive load (e.g., in the absence of another NFC device or other inductive load), during transmission of data, during reception of data, upon detection and or an external indication that of presence within a test environment (e.g., within a manufacturing environment or service facility), or other suitable operating condition. Once the measurement has been made, processing may continue to step 1304.

At step 1304, it may be determined whether measurement is complete. In some embodiments, it may be desired to test the tuning circuitry under a number of different configurations (e.g., by measuring current under multiple modified tuning characteristics, such as multiple values for a variable capacitor). In some embodiments, search algorithms may be implemented to selectively identify tuning characteristics that correspond to maximum efficiency (e.g., minimum current), the system may "sweep" different tuning characteristics to identify maximum efficiency, and such techniques may be combined. In some embodiments, the technique used may be based on current operating conditions (e.g., a faster but less accurate technique may be used during normal operation in the presence of a NFC device to achieve improvement within the interval of a "tap", while more extended techniques may be used in situations such as system start up, factory inspection, or service). If the collection of values related to transmission efficiency is complete, processing may continue to step 1308. If the collection of values related to transmission efficiency is complete, processing may continue to step 1306.

At step 1306, the tuning characteristics may be adjusted to prepare for the subsequent additional measurement of the transmit efficiency. As described for step 1304, a variety of techniques may be utilized to measure transmit efficiency under different tuning conditions. At step 1306 the tuning conditions may be modified, e.g., by modifying the value of a variable capacitor. Processing may then return to step 1302 for measurement of the transmit efficiency under the modified tuning conditions.

At step 1308, it may be determined whether it is desired to perform measurements for additional operating conditions. In some embodiments, there may be situations (e.g., system start-up, manufacturing, service, etc.) in which it may be possible to perform measurement under a variety of different operating conditions. In some embodiments, measurements may be performed with different signal characteristics (e.g., carrier signal, data signal, duty cycle, etc.), transmit voltages, environmental conditions, inductive loads, and other suitable internal or external conditions. In some embodiments, measurements under different operational conditions may enable selective tuning for different conditions, while in other embodiments an overall tuning modifiable tuning value may be set based on a balance of different operating conditions. If additional operating conditions are to be analyzed, the operating conditions may be implemented by the system (e.g., internal operating conditions) and/or identified (e.g., external operating conditions) and processing may return to step 1302. If no further operating conditions are to be analyzed, processing may continue to step 1310.

At step 1310, it may be determined whether modification of the tuning characteristics will be performed directly based on the measured transmit efficiency (e.g., current) or based on another characteristic. In some embodiments, the desired transmit efficiency (e.g., corresponding to a minimum measured current value) may be determined at a particular time (e.g., manufacturing, service, start-up etc.) and the tuning characteristics may be modified to correspond to the optimal efficiency. In some implementations with time limitations (e.g., during NFC communications with a NFC device), an abbreviated measurement routine may be performed to improve transmit performance (e.g., for a single NFC communication session or over multiple sessions). In other embodiments, other measurable values (e.g., phase shift) may be associated with a desired transmit efficiency. In an exemplary embodiment of phase shift as the other measurable value, phase shift may also be measured along with the transmit efficiency, such that a phase shift value is associated with the desired transmit efficiency. This phase shift value may then be used during normal operation of the NFC interface. In embodiments where a different transmit efficiency is associated with different operating conditions, a different phase shift associated with different operating conditions may also be used during operation of the NFC interface. If tuning is to be performed directly based on measured transmit efficiency, processing may continue to step 1312, at which the tuning conditions are updated to the tuning conditions that are associated with the desired transmit efficiency. If tuning is to be performed based on another measured value such as phase shift, processing may continue to step 1314 to measure the other measured value and modifying the tuning conditions (e.g., variable capacitor) as described herein. Once the tuning conditions are updated, the processing of FIG. 13 may end.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A transaction processing device for engaging in near-field communications (NFC) with a wireless transaction device, comprising:
   a processing unit configured to output a NFC source signal at two NFC source signal outputs of the processing unit;
   NFC transmit circuitry coupled to the processing unit to receive the NFC source signal, wherein the NFC transmit circuitry comprises matching circuitry and filtering circuitry, and wherein the NFC transmit circuitry outputs a transmit signal from two NFC transmit terminals based on the NFC source signal, the matching circuitry, and the filtering circuitry;
   a flexible circuit board having a top surface and a bottom surface, wherein the top surface and the bottom surface are opposite each other and parallel to each other;
   an antenna coupled to the two NFC transmit terminals to transmit the transmit signal, comprising:
      a first antenna terminal coupled to a first NFC transmit terminal of the two NFC transmit terminals;
      a second antenna terminal coupled to a second NFC transmit terminal of the two NFC transmit terminals;
      a top antenna portion located on the top surface of the flexible circuit board, wherein the top antenna portion has a first top end that is coupled to the first antenna terminal and a second top end, wherein the top antenna portion comprises a first circuit path between the first top end and the second top end, the first circuit path having a single loop and a substantially rectangular shape;
      a through connection coupled to second top end of the top antenna portion, and wherein the through connection provides a series connection from the second top end to the bottom surface; and
      a bottom antenna portion located on the bottom surface of the flexible circuit board, wherein the bottom antenna portion has a first bottom end that is coupled to the through connection and a second bottom end coupled to the second antenna terminal, wherein the bottom antenna portion comprises a second circuit path between the first bottom end and the second bottom end, wherein the shape of the second circuit path is substantially identical to the shape of the first circuit path, and wherein the second circuit path is substantially aligned with the first circuit path.

2. The device of claim 1, wherein the NFC transmit circuitry comprises a tuning circuit to adjust a phase the transmit signal in response to a phase difference between the NFC source signal and the transmit signal.

3. The device of claim 2, further comprising a second through connection coupled to the second bottom end of the bottom antenna portion, wherein the second through connection provides a series connection from the second bottom end to the top surface, and wherein the first antenna terminal and the second antenna terminal are positioned on the top surface of the flexible circuit board and the second antenna terminal is connected in series with the second bottom end by the second through connection.

4. The device of claim 1, wherein a direction of current flow through the first circuit path is identical to a direction of current flow through the second circuit path.

5. An antenna for a near-field communication (NFC) device, comprising:
   a substrate having a first surface and a second surface opposite the first surface;
   a first terminal and a second terminal configured to receive a signal for transmission by the antenna;
   a first circuit path connected to the first terminal, the first circuit path positioned on the first surface of the substrate and having a predetermined shape;
   a second circuit path connected to the second terminal, the second circuit path positioned on the second surface of the substrate and having the predetermined shape, wherein the second circuit path substantially overlaps the first circuit path on a portion of the second surface that is opposite the first circuit path; and
   a through connection positioned in the substrate and extending from the first surface to the second surface, the through connection connected to the first circuit path on the first surface and connected to the second circuit path on the second surface to connect the first circuit path and the second circuit path in series to cause a current to pass through the first circuit path and the second circuit path in the same direction of current flow.

6. The antenna of claim 5, wherein the first predetermined shape and the second predetermined shape have a quadrilateral shape.

7. The antenna of claim 6, wherein the quadrilateral shape is a rectangle.

8. The antenna of claim 5, wherein the first circuit path has a single loop and the second circuit path has a single loop.

9. The antenna of claim 8, wherein the single loop of the second circuit path is vertically aligned with the single loop of the first circuit path.

10. The antenna of claim 5, wherein the substrate comprises a flexible printed circuit board.

11. The antenna of claim 5, wherein the first terminal is positioned on one of the first surface or the second surface and the second terminal are positioned on one of the first surface and the second surface.

12. The antenna of claim 11, further comprising a second through connection positioned in the substrate and extending from the second surface to the first surface, and wherein the first terminal and the second terminal are positioned on the first surface, and the second through connection connected to the second circuit path on the second surface and connected to the second terminal on the first surface to connect the second circuit path and the second terminal in series.

13. The antenna of claim 5, wherein a direction of current flow through the first circuit path is identical to a direction of current flow through the second circuit path.

14. The antenna of claim 5, wherein the first surface and the second surface are parallel to each other.

15. The antenna of claim 5, wherein the substrate has a predetermined thickness and the predetermined flux pattern is dependent on the predetermined thickness.

16. The antenna of claim 5, wherein the first circuit path has a plurality of loops and the second circuit path has a plurality loops.

17. The antenna of claim 5, further comprises a tuning circuit to adjust a phase of the transmit signal provided to the first terminal and the second terminal.

18. The antenna of claim 5, wherein the distance between the first and the second surface comprises a minimum material thickness for the substrate.

19. A method for transmitting a near-field communications (NFC) signal, comprising:
   receiving a NFC source signal from a processing unit;
   modifying the NFC source signal with NFC transmit circuitry to generate a transmit signal;
   transmitting the transmit signal from the NFC transmit circuitry with an antenna, the antenna comprising a substrate with a first circuit path positioned on a first surface of the substrate and a second circuit path positioned in substantial alignment with the first circuit path on a second surface of the substrate opposite the first surface, the first circuit path being connected in series with the second circuit path via a through connection; and
   increasing a magnetic flux of the transmitted signal by flowing current in a substantially similar direction through both the first circuit path and the second circuit path.

20. The method of claim 19, wherein the increasing a magnetic flux of the transmitted signal includes arranging the first circuit path in a single loop and arranging the second circuit path in a single loop.

21. The method of claim 20, wherein the single loop of the first circuit path has a first quadrilateral shape and the single loop of the second circuit path has a second quadrilateral shape identical to the first quadrilateral shape.

22. The method of claim 21, wherein the first quadrilateral shape and the second quadrilateral shape are rectangles.

23. The method of claim 19, wherein the increasing a magnetic flux of the transmitted signal includes vertically aligning the first circuit path and the second circuit path.

24. The method of claim 19, wherein the increasing a magnetic flux of the transmitted signal includes adjusting a phase of the transmit signal based on a phase difference between the transmit signal and the NFC source signal.

25. The method of claim 19, wherein the substrate is a flexible printed circuit board having a thickness and the increasing a magnetic flux of the transmitted signal includes adjusting the transmit signal based on the thickness of the flexible printed circuit board.

26. The method of claim 19, wherein the distance between the first and the second surface comprises a minimum material thickness for the substrate.

* * * * *

UNITED STATES PATENT AND TRADEMARK OFFICE
CERTIFICATE OF CORRECTION

PATENT NO. : 10,430,784 B1
APPLICATION NO. : 15/692995
DATED : October 1, 2019
INVENTOR(S) : Yuchu He et al.

Page 1 of 1

It is certified that error appears in the above-identified patent and that said Letters Patent is hereby corrected as shown below:

On the Title Page

In the Abstract item (57), Line 2: Please replace "have a first layer on a top surface of flexible circuit board and" with -- have a first layer on a top surface of a flexible circuit board and --

In the Claims

Column 38, Line 26, Claim 2: Please replace "circuitry comprises a tuning circuit to adjust a phase the" with -- circuitry comprises a tuning circuit to adjust a phase of the --

Column 39, Line 14, Claim 11: Please replace "and the second terminal are positioned on one of the first" with -- and the second terminal is positioned on one of the first --

Signed and Sealed this
Seventh Day of January, 2020

Andrei Iancu
*Director of the United States Patent and Trademark Office*